United States Patent [19]

Braun

[11] Patent Number: 6,047,283
[45] Date of Patent: Apr. 4, 2000

[54] FAST STRING SEARCHING AND INDEXING USING A SEARCH TREE HAVING A PLURALITY OF LINKED NODES

[75] Inventor: Bernhard Braun, Rauenberg, Germany

[73] Assignee: SAP Aktiengesellschaft, Walldorf, Germany

[21] Appl. No.: 09/031,285

[22] Filed: Feb. 26, 1998

[51] Int. Cl.[7] .................................................. G06F 17/30
[52] U.S. Cl. ...................... 707/3; 707/2; 707/6; 707/8; 707/200
[58] Field of Search .................. 707/2, 3, 1, 6, 707/8, 200, 202

[56] References Cited

U.S. PATENT DOCUMENTS

| | | | |
|---|---|---|---|
| 5,613,110 | 3/1997 | Stuart | 707/1 |
| 5,745,902 | 4/1998 | Miller et al. | 707/200 |
| 5,778,361 | 7/1998 | Nanjo et al. | 707/5 |
| 5,845,274 | 12/1998 | Chadha et al. | 707/2 |
| 5,893,086 | 4/1999 | Schmuck et al. | 707/1 |

FOREIGN PATENT DOCUMENTS

| | | |
|---|---|---|
| 0419889 | 4/1991 | European Pat. Off. . |
| 9600945 | 1/1996 | WIPO . |

OTHER PUBLICATIONS

Honishi et al., "An Index Structure for Parallel Database Processing", IEEE online, pp. 224–225, Feb. 1992.

Jurgens et al., "The R/sub a/*–tree: An Improved R*–tree with materialized data for supporting Range Queries on OLAP–Data", IEEE online, pp. 186–191, Aug. 1998.

Dundas III J A: "Implementating Dynamic Minimal–Prefix Tries", Software Practice & Experience, vol. 21, No. 10, Oct. 1, 1991, pp. 1027–1040.

Corman, Thomas H., Leiserson, C.E., Rivest, R.L., *Introduction to Algorithms*, 1990, pp. 219–223, 226–229, 244–253, MIT Press, Cambridge, Mass.

Knuth, Donald E., *The Art of Computer Programming*, vol. 3, "Sorting and Searching", 1973, pp. 490–493, Addison–Wesley Pub. Co., Reading, Mass.

Van Wyk, Christopher J., *Data Structures and C Programs*, 1988, pp. 101–107,194–199, Addison–Wesley Pub. Co., Reading, Mass.

*Primary Examiner*—Anton W. Fetting
*Assistant Examiner*—Greta L. Robinson
*Attorney, Agent, or Firm*—Chadbourne & Parke LLP; Drew M. Wintringham; Francis G. Montgomery

[57] ABSTRACT

A fast string indexing method efficiently stores, searches, and removes alphanumeric or binary strings utilizing a compacted search tree. The number of levels in the search tree is minimized by having a node represent more than one character when possible. Each inner node of the tree contains a hash table array for successive hashing, which also minimizes the time required to traverse a given node. Searches may be performed for partial matches, such as wild cards at the character level. Multiple indices may be opened independently and concurrently on the same table of string entries.

48 Claims, 13 Drawing Sheets

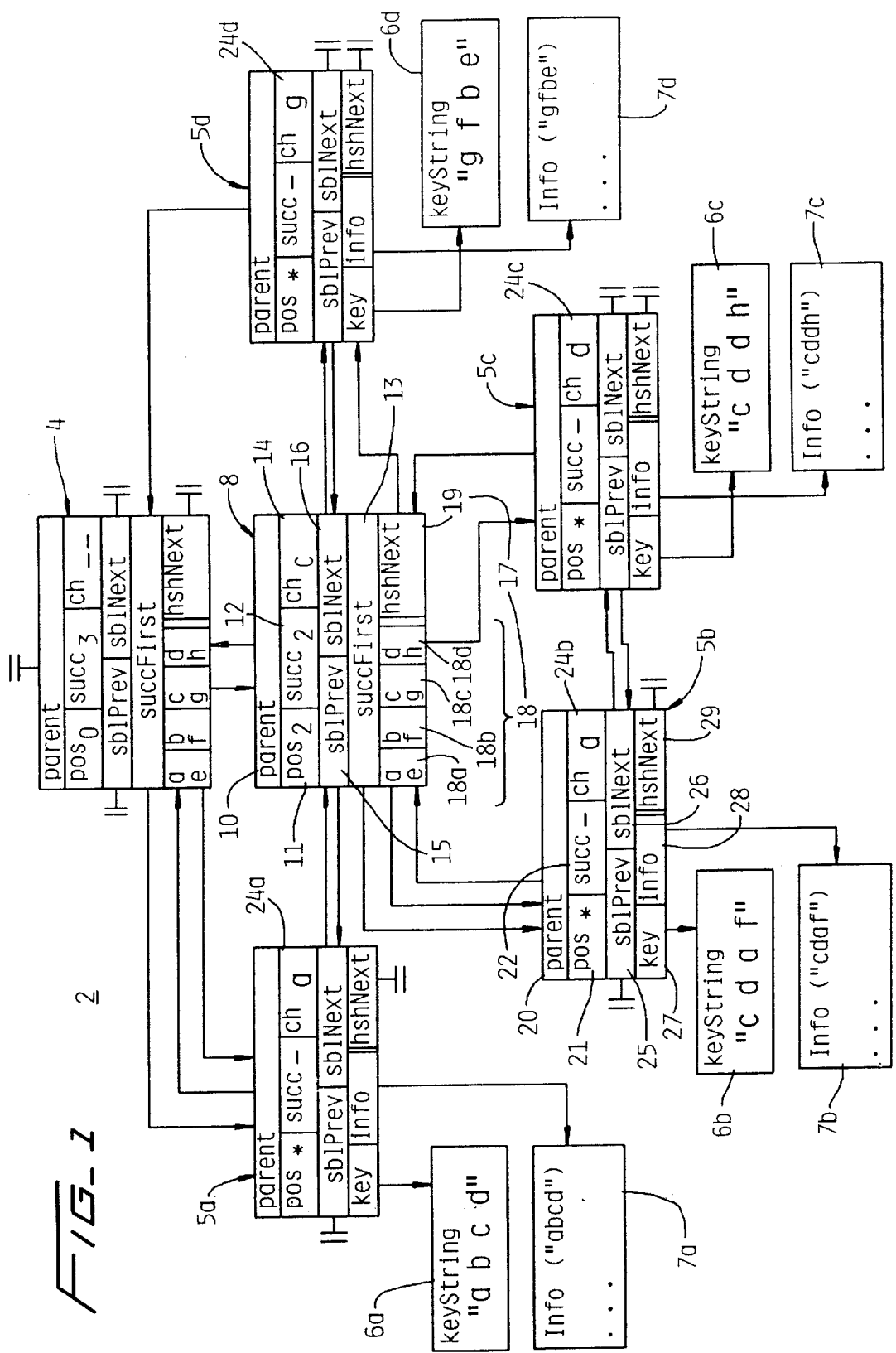

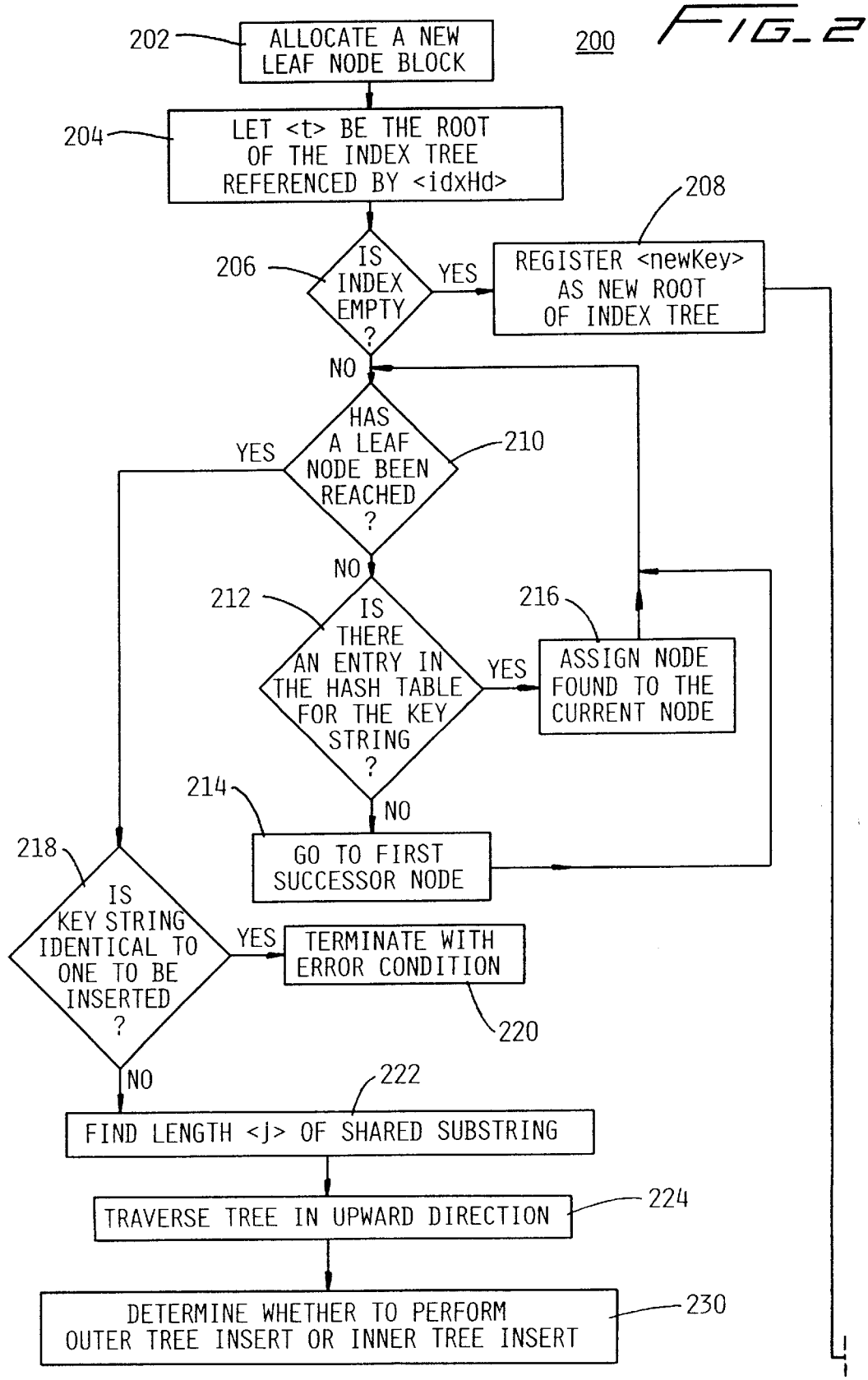

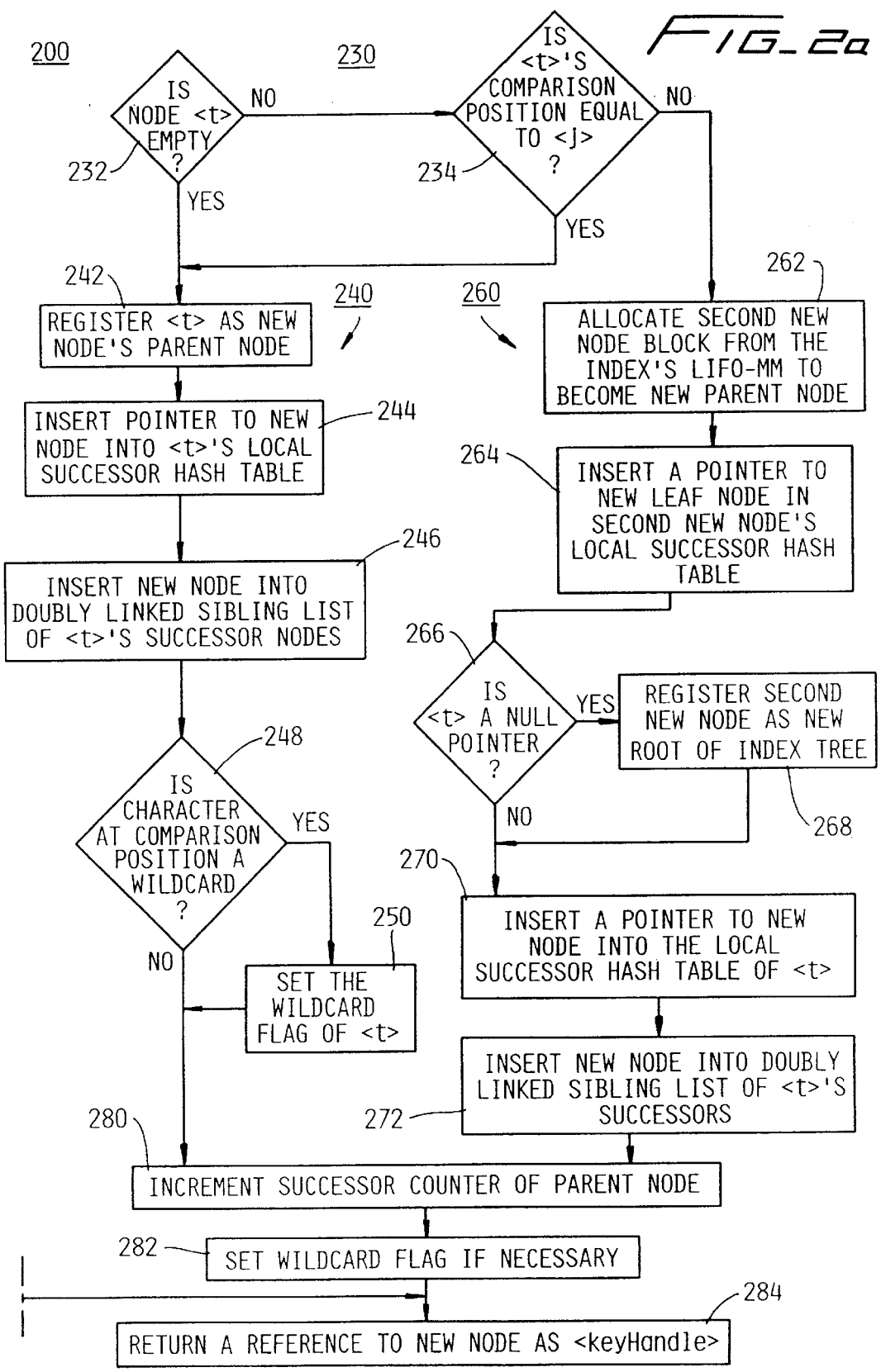
FIG_2a

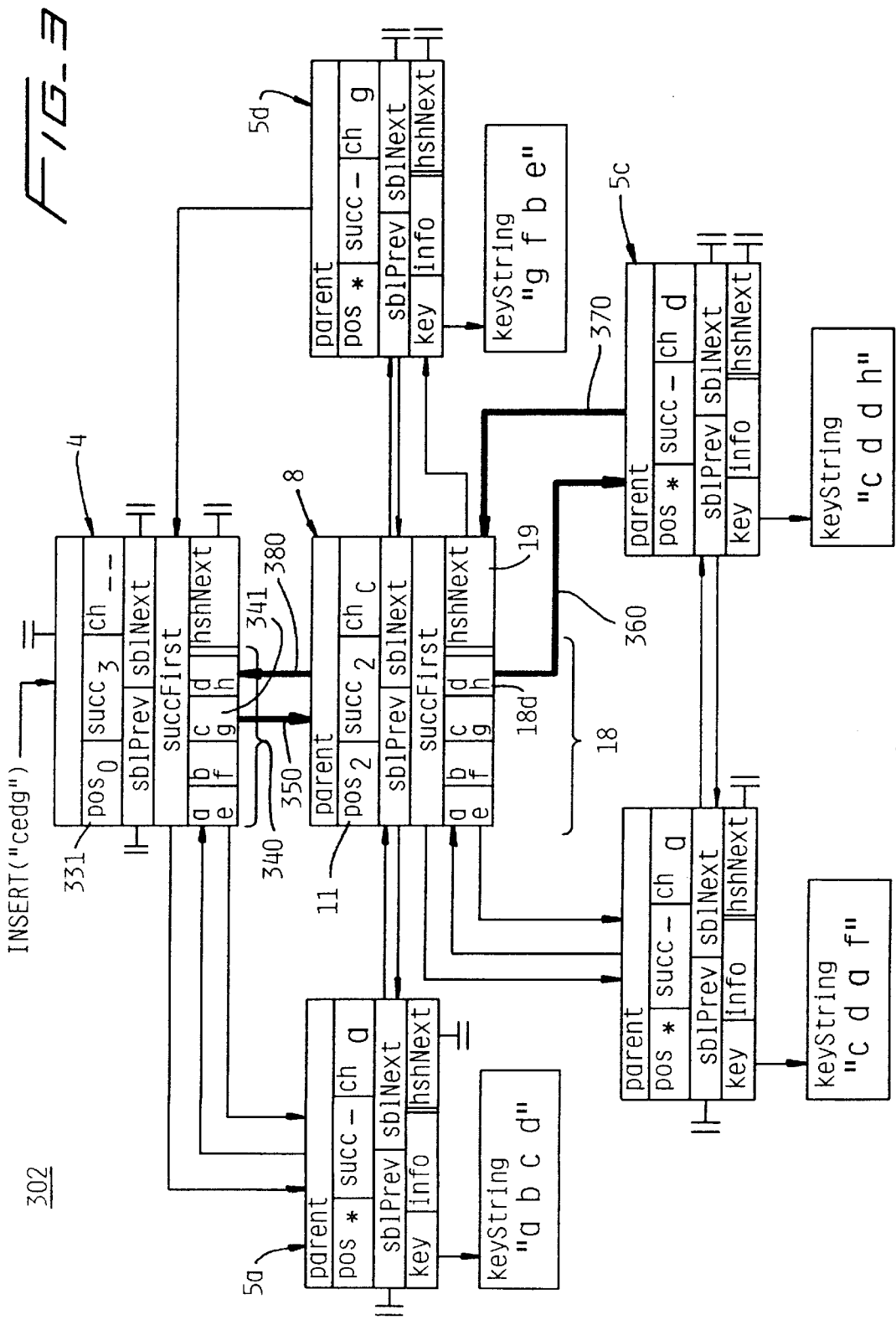

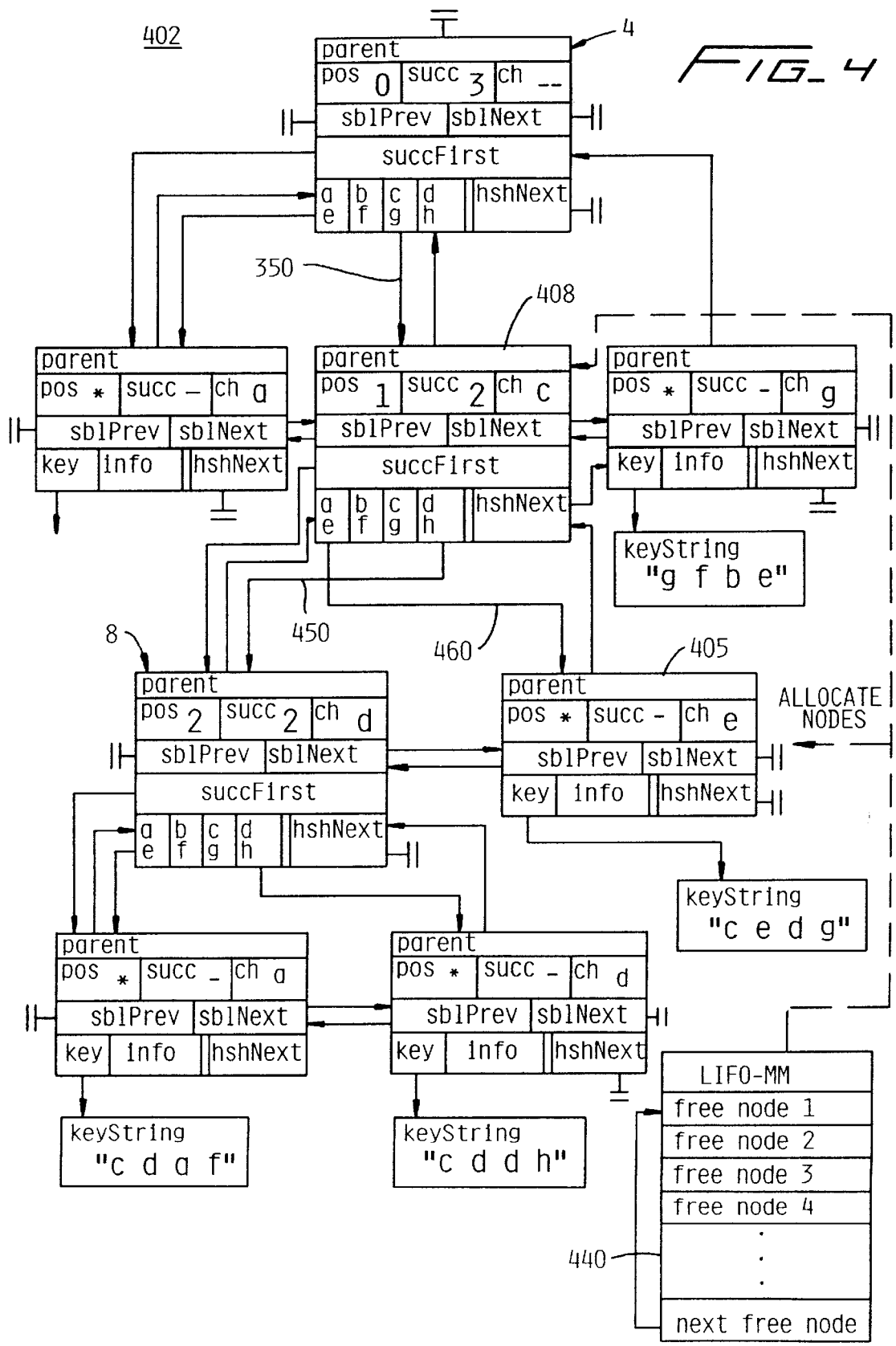
FIG_4

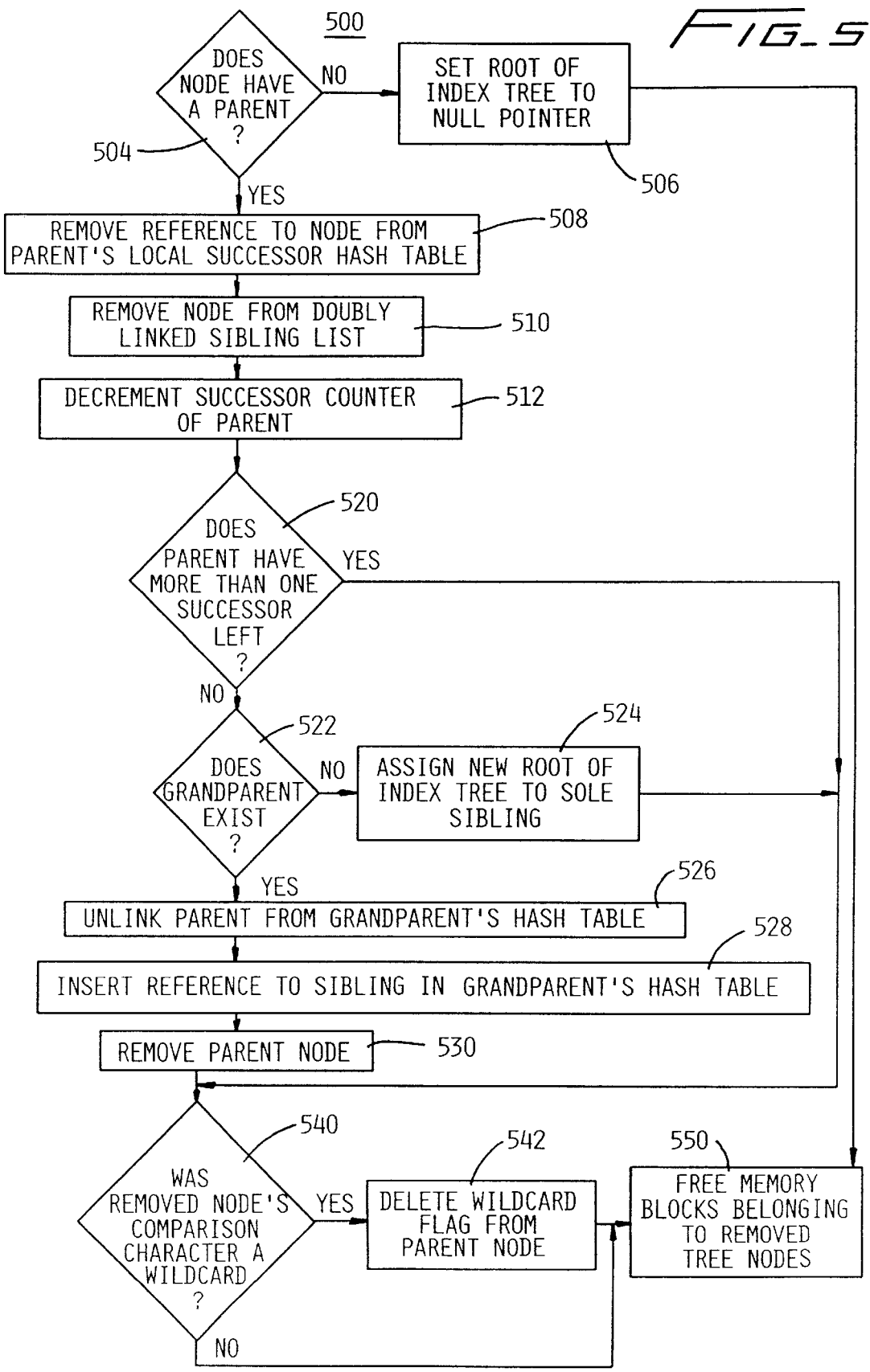

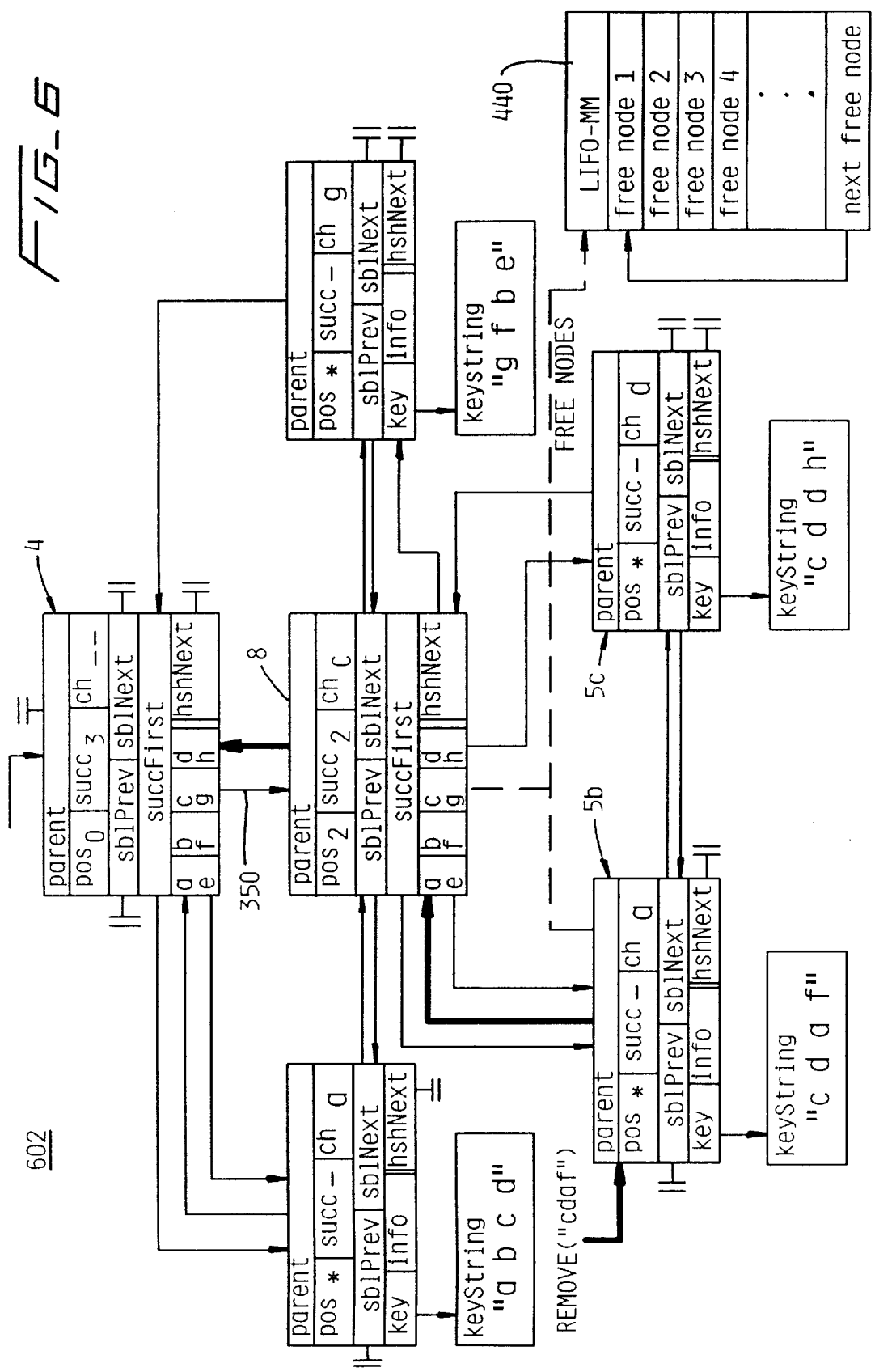
FIG_6

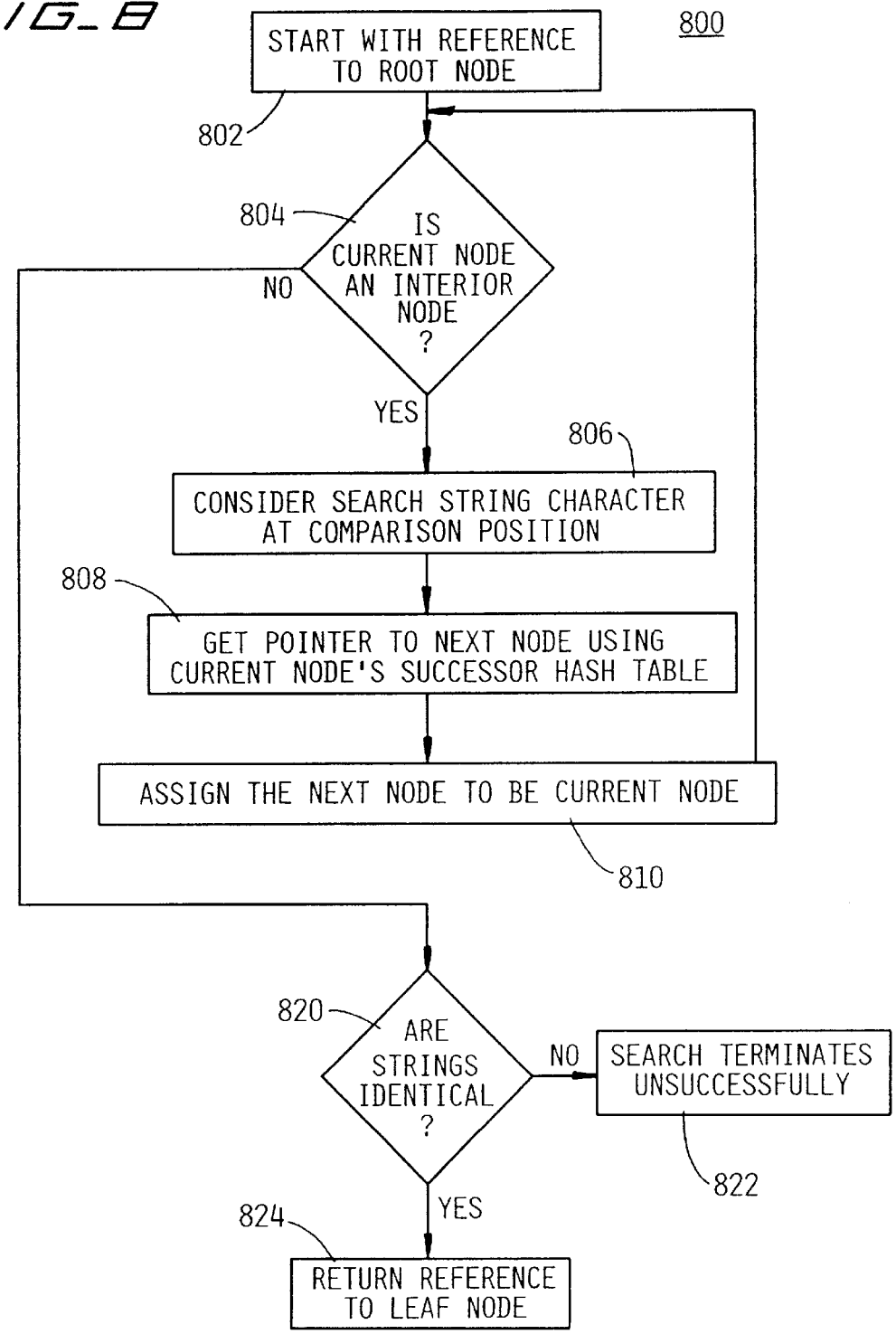

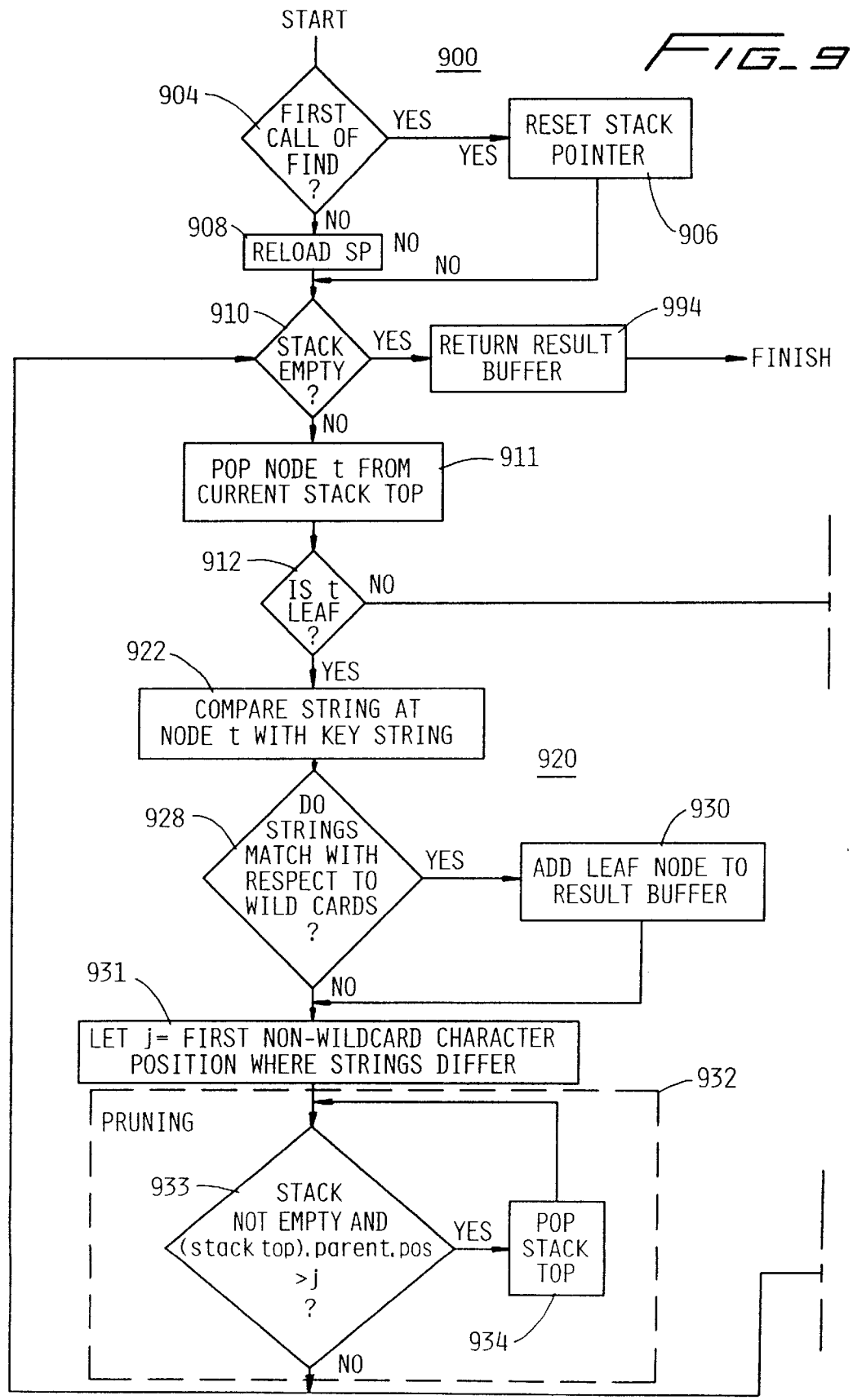
FIG_9

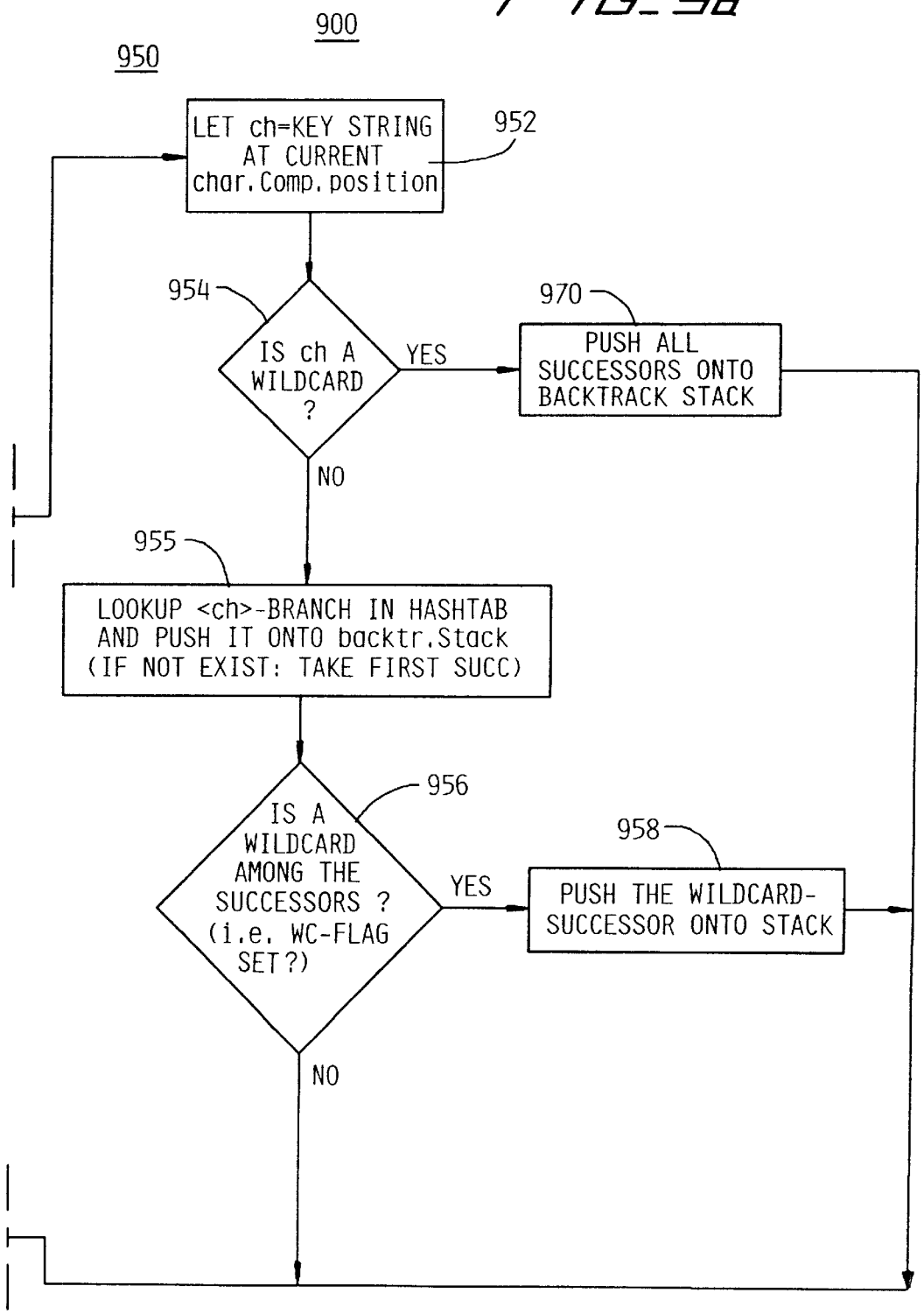
FIG_9a

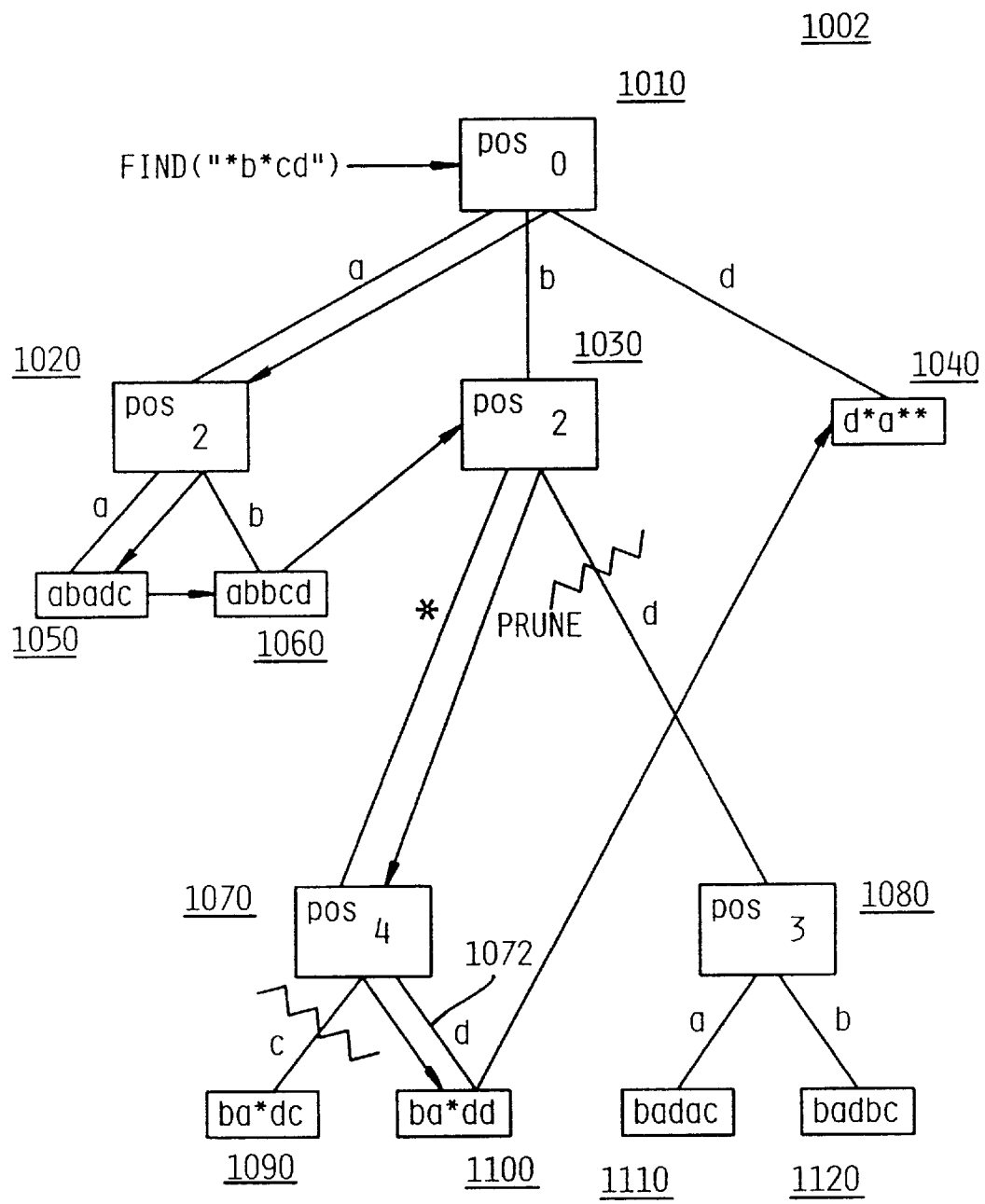
FIG_10

FAST STRING SEARCHING AND INDEXING USING A SEARCH TREE HAVING A PLURALITY OF LINKED NODES

FIELD OF THE INVENTION

This invention relates generally to database maintenance, and more specifically to indexing and searching digital data strings.

BACKGROUND

For decades, computer programmers and scientists have been discovering new and more efficient ways to maintain databases and to search their contents. Standard techniques for conducting searches include linear searching, hashing, and binary search trees.

The linear search technique is the most basic method for conducting a search of keys or strings (the term "string" is used to describe a group of alphanumeric or binary characters). This straightforward method loops over all the existing strings, which are usually organized as an array or a linear linked list, comparing each string $K_i$ with the requested string K. A linear search may be represented by the following pseudo code:

FOR i=1 TO n DO
    IF $K_i$=requested string K THEN RETURN $I(K_i)$
END DO where I(K) is the information record associated with string K. The running time of such a search, using O-Notation (a function f(n) is said to be O(g(n)) if there exists a number $n_0$ such that f (n)≦const. factorg(n) for all n≧$n_0$), is:

$T_{linear}(n)=O(n)$

Thus, the running time of a linear search grows proportionally with the number of strings n.

Because of its simplicity, a linear search has less overhead processing per character comparison than more advanced searching methods. Generally speaking, a linear search is faster than other searching methods when the set of strings to be searched is small. Therefore, and for ease and robustness of implementation, linear searches are often preferred for small scale searches, where n<100.

A disadvantage of linear searching is the linear dependency on the number of entries, or strings, n. The linear search method becomes impractical for high performance applications for growing n. Searching a 10,000-entry table will be 1,000 times slower than searching a 10-entry table.

Another popular technique for searching is hashing. Hashing computes the address or location of a given string directly from the string's binary representation, rather than by exhaustively searching all strings as in the linear search method. A hash search is often a two-step process, wherein the hash function H returns an index referring to a small list of strings that are searched using the linear search method. A hash search may be represented by the following algorithm in pseudo code:

i=H(K)
RETURN T(i)

where the hash function H computes the index of the given string, returning index i. Index i may refer to the matching string alone, or may refer to a list of strings that must then be searched linearly for the matching string.

A commonly used hash function H organizes or indexes the strings into a hash table T utilizing the following formula:

H(K)=(sum of all bytes $b_1, \ldots, b_m$ (ASCII codes) of the key string K) module M where M denotes the size of hash table T. Obviously, the hash function H cannot in general be guaranteed to be unique for each string. When two or more strings result in the same hash function ($H(K_i)=H(K_j)$) for different strings $K_i \neq K_j$), it is called a collision case. The most common way to deal with a collision case is to maintain lists of strings with identical hash values for each hash table entry, which requires searching, usually by the linear search method, a collision list in order to uniquely find the requested entry.

In general, the running time of hashing depends on the average length of the collision lists, which in turn depends on the distribution of the hash function H as well as the hash table size M. Assuming hash function H has a nearly perfect distribution (i.e. the probability for any key string K to be scattered to index i=H(K) is equally likely for all i=1 . . . M), it can be shown that the average running time of hashing will be $T_{hash}(n)=O(n/M)$ The result is a running time that is nearly constant for sufficiently large hash table sizes M>n. Therefore, in theory, the running time could be expected to be nearly independent of n, provided that a perfect hash function (an unrealistic expectation in the majority of real-world applications) could be used.

A disadvantage of hashing is that the inherent need for resolving collision cases requires an additional, and sometimes lengthy, search to take place. Although the average search utilizing the hash technique may be quick, the actual length of time to complete a search may be considerably worse for certain string distributions. In the worst case, all the strings happen to end up in the same index, and the overall performance of the search will be no better than for a linear search. Therefore, in practice, finding an efficient hash function for a real-world application is a difficult task, and is significantly dependent on the actual probability distribution of the strings to be indexed.

Another disadvantage of hashing is that it does not lend itself to wildcard searches. A wildcard search is one where one or more characters in the search string is a wildcard character (i.e., a character that can replace any other character). A wildcard search often returns multiple matching strings.

Another technique for searching is the search tree method. Before this type of search is performed, a search tree must be created to organize the data on which searches are to be performed. A variety of search tree implementations have been proposed, among which one of the most basic is the binary search tree, which is defined as follows.

A (binary) tree T over a set of strings $K_1, \ldots, K_n$ (represented by the tree nodes) is called a search tree, if for every sub-node T the following condition holds:

value($T_l$)<value($T_r$) for every descendant node $T_l$ in the left subtree of T and every node $T_r$ in the right subtree of T, where value(T) is the string value associated with the tree node T.

Thus, the basic search procedure can be (recursively) formulated in pseudo codeas follows (as usual, K denotes the string which is being searched and special cases like non-existent keys are omitted for simplicity):

PROCEDURE TREE-SEARCH(T,K)
    IF K=value(T) THEN

```
RETURN Information associated with T
    ELSE
        IF K<value(T) THEN
            TREE-SEARCH(left-subtree(T),K)
        ELSE
            TREE-SEARCH(right-subtree(T),K)
        ENDIF
    ENDIF
```

The search tree method outlined above executes a depth-first tree traversal, resulting in a running time that grows proportionally to the depth of the tree. Consequently, given an adequately balanced search tree (i.e., one whose leaf nodes are essentially evenly distributed), the average running time is $T_{tree}=O(\log_2 n)$ Thus, in theory, the average running time grows logarithmically with the number of entries or strings. This is a substantial improvement over linear searches when searching through a large number of entries.

A disadvantage of the tree search method is that under field conditions, the running time may vary greatly because in practice search trees are rarely balanced. The tree's balancing properties are heavily dependent upon the actual string distribution. More sophisticated methods, such as AVL-trees, described in Van Wyk, Christopher J., *Data Structures and C. Programs*, Addison-Wesley Publishing, 1988, have been invented to minimize this problem. Such methods, however, tend also to increase the implementational overhead for tree structure administration. In practice, and depending on the actual implementation, tree-based searches rarely outperform simple linear searches unless the number of entries exceeds a break-even point of several hundred entries.

The present invention overcomes the foregoing problems by providing a method for fast indexing and retrieval of alphanumeric or binary strings that supports both generic indexing and partial match queries. The invention utilizes a unique compacted index tree wherein a node may be used to step through a plurality of characters in a search string, and can have as many successor nodes as there are individual characters in the underlying string alphabet (e.g., 256 for 8-bit based characters). Furthermore, the invention uses backtracking when a plurality of subtrees needs to be searched for possible multiple matching strings during a wildcard search. The invention also takes advantage of heuristic subtree pruning, a method by which partial match searches may be accelerated by discarding whole subtrees.

Although the present invention is contemplated for use with strings, such a search method may be used to search any digital information stored in a database.

SUMMARY OF THE INVENTION

The present invention relates to a method for indexing and searching digital data that is stored in the form of strings. This provides a means for quickly searching through a database to match a given query string. In the embodiment disclosed, the search method is utilized in association with alpha numeric strings for illustrative purposes.

It is an object of this invention to provide a method for searching strings that is, for certain applications, faster than any known search method.

It is another object of this invention to provide a method for searching strings that is, for most applications, faster than linear searches, hash searches, or binary tree searches.

It is another object of this invention to provide a method for searching strings that supports partial matches, such as wild cards at the character level.

It is another object of this invention to provide a method for searching strings that supports generic indexing, including generic storing of partially specified strings within the index.

It is another object of this invention to provide a method for searching strings that is particularly efficient for large string sizes.

It is another object of this invention to provide a method for searching strings that has robustness against unequally distributed string distributions.

It is another object of this invention to provide a method for searching strings that prevents the unbounded degeneration that occurs in binary trees or hash collision lists.

It is another object of this invention to provide an implementation for searching strings that minimizes internal tree structure administration overhead. Therefore, even for tables that have fewer than 100 entries, the implementation disclosed will often be faster than linear searches.

It is another object of this invention to provide an improved method of logical lock management.

According to the invention a method for indexing a plurality of string entries is proposed, wherein each one of the plurality of string entries is a string of characters. In the invention a search tree comprising a plurality of linked nodes is used. The plurality of linked nodes comprises a root node, a plurality of inner nodes wherein each of the plurality of inner nodes is associated with a character or substring of characters which are components of a plurality of string entries, and a plurality of leaf nodes, each leaf node representing a character or substring from an individual string entry. Further, in an embodiment of the invention, each one of the plurality of inner nodes comprises (a) a reference to a parent node, wherein the parent node is one of another of the plurality of inner tree nodes or the root node, (b) a first data field containing a character comparison position indicating the number of characters in said character or substring of characters associated with said one of said plurality of inner nodes; (c) a second data field containing a comparison character, said comparison character used to determine whether said character or substring of characters associated with said one of said plurality of inner nodes is contained in a string entry at a character position of said string entry associated with said character comparison position; (d) a reference to at least two successor nodes; and (e) a hash table array containing a predetermined number of hash buckets.

A method according to the invention is for searching for a certain key string consisting of a plurality of characters among a plurality of strings, wherein each one of said plurality of strings is a string of characters. This method comprises the steps of (a) forming a query associated with the certain key string and traversing a search tree, wherein the search tree is associated with a plurality of strings forming a plurality of string entries, (b) utilizing the query and (c) providing an index to any of the plurality of strings that matches the certain key string.

This method can be particularly useful when used in connection with a human resources management, financials, logistics, business workflow, personnel management, organizational management, payroll accounting, time management, personnel development or network, e.g., internet intranet, system. Such a system may particularly be an R/3 system available from SAP, Walldorf in Germany.

Some basic aspects of the invention and preferred embodiments may be characterized as follows.

The fast string indexing method according to the invention efficiently stores, searches, and removes alphanumeric or binary strings utilizing a compacted search tree. The number of levels in the search tree is minimized by having a node represent more than one character of a string or strings when possible. Each inner node of the tree contains a hash table array for successive hashing, which also minimizes the time required to traverse a given node. Searches may be performed for partial matches, such as wildcards at the character level. Multiple indices may be opened independently and concurrently on the same table of string entries when, for example, a search utilizing wildcards returns multiple results that the searcher wishes to open concurrently.

The invention and preferred embodiments are described with reference to the following drawings.

BRIEF DESCRIPTION OF THE DRAWINGS

FIG. 1 is a representation of an example of the basic data structure of an index tree embodying an application of fast string indexing.

FIG. 2 and FIG. 2a are a representation of a flowchart for a preferred embodiment of the INSERT operation.

FIG. 3 is a representation of the first half of an example of an INSERT operation being performed.

FIG. 4 is a representation of the second half of an example of an INSERT operation being performed.

FIG. 5 is a representation of a flowchart for a preferred embodiment of the REMOVE operation.

FIG. 6 is a representation of the first half of an example of a REMOVE operation being performed.

FIG. 8 is a representation of a flowchart for a preferred embodiment of the Exact Match FIND operation.

FIG. 9 and FIG. 9a are a representation of a flowchart for a preferred embodiment of the Partial Match FIND operation.

FIG. 10 is a representation of an example of a Partial Match FIND operation being performed.

DETAILED DESCRIPTION OF THE INVENTION

Figure 7:
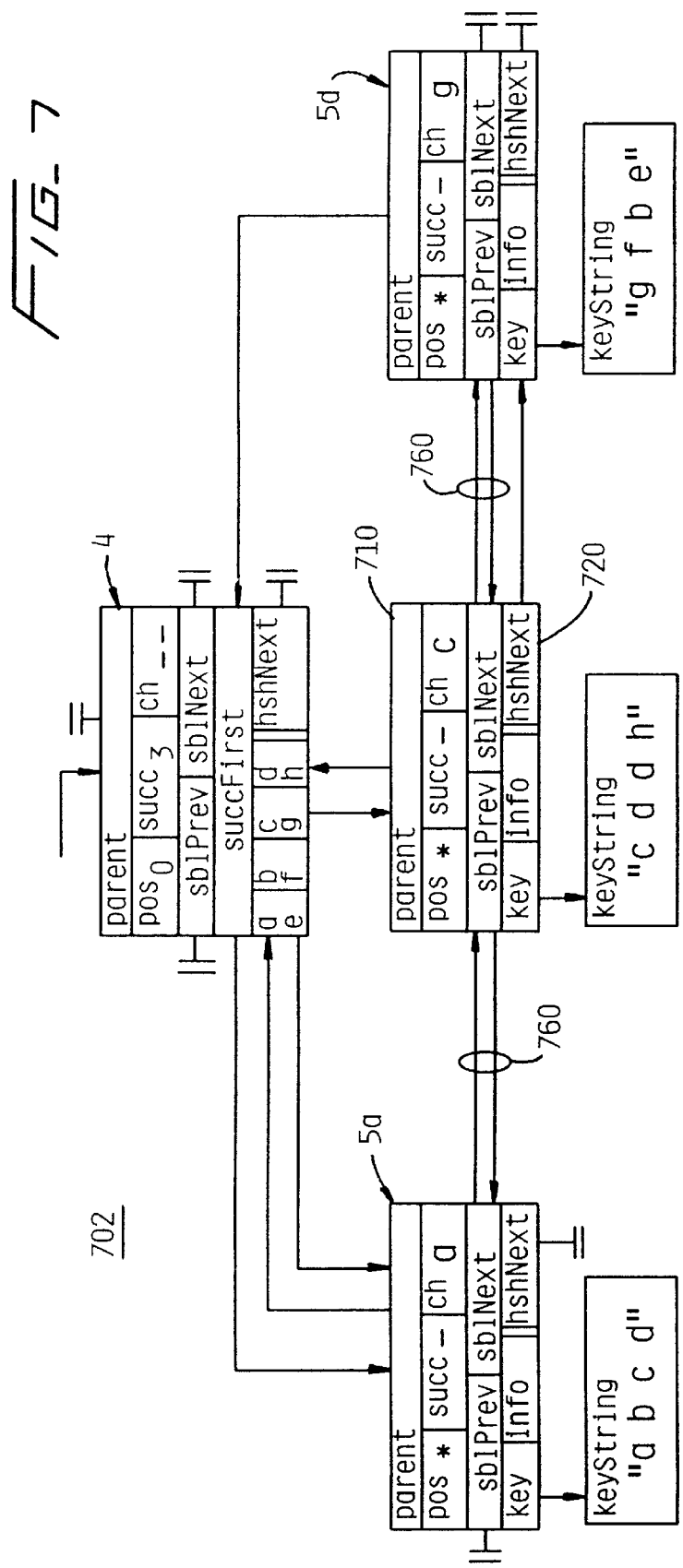
FIG. 7 is a representation of the second half of an example of a REMOVE operation being performed.

The present invention was developed as an improved method for conducting searches and maintaining databases. The invention has many advantages over traditional searching and indexing methods, one of which is speed. The superior speed is mainly attributable to three factors: robustness against number of entries or key strings, robustness against key string distribution, and robustness against key string length. All three factors are described in further detail below.

A set of n random m-character key strings, denoted by $K_1 = b_{11} \ldots b_{1m}, K_2 = b_{2m}, \ldots, K_n = b_{n1} \ldots b_{nm}$ is to be indexed. For illustrative purposes, let us assume the common case where each character is encoded as an eight-bit byte, and that the length of each key string is 256 bytes (m=256).

Robustness against number of key strings refers to limiting the inherent increase of average running time of the basic operations of INSERT, REMOVE, and FIND as the number of strings n increases.

The fast string method disclosed in this invention (and referred to in a preferred embodiment as "FI") traverses an index tree (whose structure looks similar to that of a binary tree, except that interior nodes may have multiple subtrees directly descending therefrom, rather than just two) from top to bottom while concurrently stepping through the search string from left to right. If the last character of the search string is reached, the process has either arrived at a leaf node of the index tree indicating a match, or has detected that the search string is currently not in the index. Thus, the average total number of tree node inspections must be less than or equal to the average depth of the index tree.

The average depth of the index tree utilized in conjunction with the invention may be computed as follows. Let the average branching factor k of the index tree be defined as the average number of descendant subtrees springing from any interior node. Therefore, k is less than or equal to the number of underlying characters in the underlying alphabet (e.g. 256 for 8 bits). However, in practice the average branching factor is significantly less than this number, since the real-world distribution of key strings is usually far from being uniformly distributed. Experimental results using large sets of random real-world data show that a reasonable average branching factor is in the range of k=3 . . . 7 for underlying alphabets of 4 to 9 bits and string lengths of 16 to 512 characters.

Since the number of interior nodes increases by a factor of k for each subsequent level of a tree T, the total number of leaf nodes n (equal to the total number of key strings) at the final level can be represented as $n = k^{depth(T)}$ or depth $(T) = \log_k n$ Furthermore, since the average running time of the FI operations INSERT, REMOVE and FIND is equivalent to the tree depth, it may be denoted as $T_{FI}(n) = O(\log_k n)$ and execution time grows only logarithmically with increasing number of entries. For example, when k=4, every quadrupling of the number of key string entries will add, on average, only one more level for these operations to consider.

Robustness against key string distribution refers to limiting the variance of search time for a given set of entries. In other words, a search for any one particular entry should ideally take the same amount of time as a search for any other entry, especially with respect to the worst case (i.e., the worst case should not take much more time than the average case). However, due to real-world distributions of key strings, a binary tree may have some leaf nodes near the top of the index tree and other leaf nodes at extreme depths. In the worst case, a binary tree may degenerate to the point where a search for some entries take as much time as a linear list search. AVL trees are somewhat better distributed than binary trees, but at the expense of a drastically increased administrative overhead for maintaining the algorithm's data structures, which in turn leads to worse overall performance. Hashing algorithms can also suffer from an unbalanced distribution of entries. Ideally, the entries are uniformly distributed across the hash table, and the collision lists are more or less uniformly long. In practice, some collision lists will be longer than others. In the worst case, all the entries are mapped to the same hash slot, and a hash search will be equivalent to a linear list search.

Although the FI index tree is not generally a perfectly balanced tree, the degree of maximum degeneration is limited because at least one string character is traversed in the search string for each descendant step down the tree. Thus, the total depth of a tree T is limited by the key string length m, which is usually a number logarithmically less than the total number of entries n.

Robustness against key string length refers to limiting the dependence of search time on the average length m of the individual entries. This is an important consideration in applications such as logical lock management, where each key string may correspond to an entire database table line. It may be important in these applications to index and search key strings that are hundreds, if not thousands, of characters long. Using traditional searching methods, large key string length often requires lengthy character-by-character comparisons for each search step.

FI searching has the ability to index key strings in such a way that each search step may cover multiple characters in the search string. There is only one single character inspection necessary per search step, regardless of the actual string length. Since the depth of the FI index tree T is usually much less than the string length m, a large part of the string does not have to be inspected and can be skipped during the search process. It has been confirmed by experimental results that in most real-world applications, FI performance does not vary much with key string length. FI only needs to perform one final comparison of the search string and the leaf node (or nodes, in the case of wildcard searches) found in the search to verify that there are no false returns.

Illustrative Example

An example of basic structure of a preferred embodiment of an FI index tree 2 is illustrated in FIG. 1. In this particular illustration, the database associated with the tree already has the following key string entries: "abcd", "cdaf", "cddh", and "gfbe". For simplicity and illustrative purposes only, the underlying alphabet for these key strings has eight characters (3 bits). It is to be appreciated that smaller or larger alphabets (for example, based on 8 bits) may be more useful for most applications.

At the top of index tree 2 is root node 4, which is the first node created upon initialization of an index tree. Leaf nodes 5a, 5b, 5c, and 5d are associated with key string fields 6a, 6b, 6c, and 6d, respectively, which contain the indexed key strings, and with information fields 7a, 7b, 7c, 7d, respectively, which contain any additional data that a user may wish to associate with the indexed key strings. It is to be appreciated that a user may wish to associate a plurality of information fields with a given key string. For example, the key string may be an employee identification number, and separate information fields may exist for the employee's name, address, phone number, etc.

As with a binary tree, there are interior nodes that are not associated with a particular key strings or user-provided information, but rather are associated with comparisons that provide direction toward a desired leaf node. Only one interior node 8 is depicted in FIG. 1, but it is obvious to those skilled in the art of computer programming that index trees often have numerous interior nodes.

Interior node 8 contains several data fields. Parent field 10 makes reference to that node's parent node, root node 4. Pos field 11 contains information on what is referred to as the node's character comparison position (pos). This field is maintained for each inner node such that the following condition is satisfied: The first pos characters (i.e., a substring of length pos) are identical for all key strings associated with leaf nodes contained within the subtree springing from that node. The character comparison position indicates that a character comparison is to take place at the subsequent node following the common substring. It is used to accelerate the search process over the index tree by skipping identical character sequences. A property of the F1 tree is that all strings contained in the leaf nodes of a specific subtree have the same prefix. For example, leaf nodes 5b and 5c, which along with interior node 8 constitute a subtree, are associated with key strings "cdaf" and "cddh", respectively. These two substrings share the prefix "cd". In this example, the pos field 11 of interior node 8 would contain the character comparison position number two, as this is the length of the common prefix of all strings contained in the subtree springing from interior node 8. The character associated with this character comparison position is the third character, which is the first character that the two substrings do not have in common.

Succ field 12 keeps track of the current number of successor nodes. In the example, interior node 8 has two successor nodes, leaf node 5b and leaf node 5c. SuccFirst field 13 is a reference to the first node of a doubly linked, NULL-terminated list (sometimes called a sibling list) of all successor nodes. In the example, SuccFirst field 13 of interior node 8 references leaf node 5b. SuccFirst field 13 is used, among other things, for the REMOVE function, which will be described below.

Ch field 14 contains the node's comparison character. The comparison character is the first character that distinguishes a node from its sibling nodes (which otherwise share the same substring).

SblPrev field 15 is a reference link to the previous (left neighboring) node of the sibling list. If there is no previous node of the sibling list, then the reference link is a NULL reference. Similarly, sblNext field 16 is a reference link to the next (right neighboring) node of the sibling list. If there is no next node of the sibling list, then the reference link is a NULL reference. In the example, sblPrev field 15 of interior node 8 is a reference link to leaf node 5a, and sblNext field 16 of interior node 8 is a reference link to leaf node 5d.

Local successor hash table 17 is used for searching and identifying the correct successor branch to follow (i.e., which node one level further down the tree to proceed to during a given search). Local successor hash table 17 consists of hash table array 18 and hashNext field 19. Hash table array 18 contains a fixed number of hash buckets representing character values. In the example, the eight characters constituting the underlying key string alphabet have been evenly distributed across four hash buckets 18a, 18b, 18c, and 18d. Since (as described above) all the key strings contained in the leaf nodes of the subtree springing from interior node 8 have the same starting pos characters (which would be the two characters "cd" in the example), the subsequent character (also called the "character comparison position" character) for these pos strings (namely, "a" and "d", respectively) is placed in the hash buckets. In the example, characters "a" and "e" have been assigned to hash bucket 18a, "b" and "f" to hash bucket 18b, "c" and "g" to hash bucket 18c, and "d" and "h" to hash bucket 18d. Thus, hash bucket 18a has a reference link to leaf node 5b, and hash bucket 18d has a reference to leaf node 5c.

HashNext field 19 serves as a reference link for the hash collision list. In the example, since "c" and "g" are also assigned the same hash bucket in the hash table array of root node 4, and since in one preferred embodiment each hash bucket can have a reference to only one other node, it is necessary for the successor node (of root node 4) whose comparison character is "c" to reference its sibling node whose comparison character is "g". Thus, hashNext field 19 of interior node 8 has a reference link to leaf node 5d.

A root node may be a leaf node (when the index tree consists of only one entry) or an interior node. In the example, root node 4 is an interior node. Thus, root node 4 has the same fields as interior node 8. A distinguishing feature of root nodes is that they do not have a parent node (thus, the parent field of root node 4 contains a NULL pointer).

Leaf nodes 5a, 5b, 5c, and 5d also contain several data fields. Referring to FIG. 1, leaf node 5b is taken as an example of a typical leaf node. Parent field 20, ch field 24b, sblPrev field 25, and sblNext field 26 of leaf node 5b are analogous to parent field 10, ch field 14, sblPrev field 15, and sblNext field 16 of interior node 8. Pos field 21 is set to a special value of "infinite" to distinguish it as a leaf node. The content of succ field 22 is undefined, since leaf nodes do not have successors. Key field 27 references the key string field 6b, while info field 28 references information field 7b.

In the example, it should be apparent that key string "abcd", the only key string starting with the character "a", would be associated with leaf node 5a, whose ch field 24a contains the character "a". Similarly, the key string "gfbe", the only key string starting with the character "g", is associated with leaf node 5d, whose ch field 24d contains the character "g". Since there are a plurality of keystrings starting with the character "c" (namely, "cdaf" and "cddh"), the leaf nodes associated with those key strings cannot be successors of root node 4. Rather, interior node 8 is utilized to compare the first character that the key strings starting with the character "c" (which is also the character stored in ch field 14) do not have in common. Since pos field 11 provides the information that the first two characters of these key strings are the same, the third character is used to determine which hash bucket is applicable. If the third character is "a", a reference is made to leaf node 5b. On the other hand, if the third character is "d", a reference is made to leaf node 5c.

Initialization

An FI library is initialized within a memory area supplied by the user via an initialization process. Upon completion of the initialization process, a handle to the initialized FI instance is returned. The user may define an identifier string, also known as an eyecatcher, to refer to a supplied memory buffer. This ensures one-time initialization in a multi-process application, wherein the buffer usually resides in shared memory. The following input and output parameters are used in the CREATE operation, which is a preferred embodiment of the initialization process.

The input parameters include <buffer>, <ident>, <maxIndex>, <maxKeys>, <maxKeyLen>, and <wildcardCh>. The <buffer> parameter is a contiguous memory area supplied by the user for FI administration. <buffer> may also be a shared memory address for multi-process applications. The <ident> parameter is an eyecatcher that uniquely identifies an FI instance, and is used to prevent multiple initializations in multithreaded applications. The <maxindex> parameter provides the maximum number of individual indices that can be handled independently. The <maxKeys> parameter provides the maximum number of index entries (key strings), and is the sum of nonrepetitive entries of all individual indices. The <maxKeyLen> parameter gives the maximum key string length, in bytes, for the key strings in all the indices. The <wildcardch> parameter contains the character to be used as a wildcard for partial match searches.

The output parameter <handle> is a reference to the newly-created FI instance, and is used as a handle (reference) for subsequent FI library calls.

The initialization process accomplishes several objectives. One purpose is to initialize an FI administration structure in memory. Another is to provide an eyecatcher to detect any multiple initializations (in order to ensure one-time initialization in multi-process and/or multi-thread environments). The initialization process also initializes fast LIFO (last in, first out) based memory management that is of fixed size, for allocating and freeing index tree nodes in substantially constant time. Furthermore, an internal node stack is initialized so that backtrack points may be stored when recursively searching the index tree in partial match queries.

Opening Index Objects

Multiple indices may be opened on the same set of data at the same time, which allows, for example, inverted indices to be used simultaneously. The OPEN operation creates a new, empty index object within a global FI instance previously initialized by the CREATE operation. The following input and output parameters are used in a preferred embodiment of the OPEN operation.

The input parameters include <fiHd>, <IdxId>, and <maxKeyLen>. The <fiHd> parameter is a global FI instance (returned by the CREATE operation). The <IdxId> parameter is an eyecatcher that uniquely identifies the index being opened, and is used to prevent multiple initializations in multi-process applications that share memory. The <maxKeyLen> parameter gives the maximum key string length, in bytes, for the key strings to be placed in the index, and may be less than or equal to the value of <maxKeyLen> in the CREATE operation.

The output parameter <handle> is a reference to the newly-created index object, and is used as a handle for subsequent index operations.

INSERT Operation

The INSERT operation inserts a specified key string into a specified index object. As noted above, user-supplied data is associated with each key string in the index.

Every time a key string is inserted into an index, a new FI key object (i.e., leaf of the index tree) is created internally, and a handle to the key is returned to the caller. The handle may be used in the future to reference key entries in the index tree directly (e.g., for the REMOVE operation). The key strings themselves are not stored within the index memory. Rather, FI references the string via a reference supplied by the user.

In a preferred embodiment, the key string to be inserted has a length of at least <maxKeyLen> that was specified by the OPEN operation, and has no string termination character. In this embodiment, strings that are shorter than <maxKeyLen> should be padded on the right with blank characters.

It is to be appreciated that embodiments of the invention using string termination characters and/or wildcards may complicate the indexing of key strings that contain arbitrary binary data. Techniques presently known in the art (such as encoding binary data in alternative formats, or storing a <KeyLen> field with each key string field specifying the key string's length) may be used to overcome these complications.

In a preferred embodiment, the INSERT operation may be used on strings that contain wildcard characters. As a result, whole sets of keys may be logically stored with a single index insert operation. For example, assuming that "*" is a wildcard, and that the operation INSERT("bcd") is followed by FIND("bcdef") and FIND("bcdgh") (the FIND operation will be described in detail below), both queries will yield the string "bcd". Thus, the wildcard indexing feature of F1 may be used for collision detection purposes (e.g., database logical lock management). The following input and output parameters are used in a preferred embodiment of the INSERT operation.

The <idxHd> input parameter is the handle of the index object being accessed. The <keyStr> input parameter is a pointer to the key string to be inserted into the index. The <usrInfo> input parameter is a pointer to data that the user wishes to associate with the key string being inserted into the index.

The output parameter <keyHandle> is a handle for the newly inserted key object.

The steps performed by a preferred embodiment of the INSERT operation is outlined in flowchart 200, which is shown in FIGS. 2 and 2a. The first step is allocation 202 of a new leaf node block in memory. Next, reference 204 is made by having <t> be the root of the index tree referenced by input parameter <idxHd>. Decision 206 determines whether the index is empty at the root. If so, registration 208 of <newKey> is made as the new root of the index tree, and the operation goes on to return 284 of a reference to the new leaf node block allocated in allocation 202 occurs as output parameter <keyHandle>.

On the other hand, if it is found at decision 206 that the index is not empty at the root, decision 210 determines whether a leaf node has been reached. If one has been reached, decision 218 is performed. On the other hand, if a leaf node has not yet been reached, lookup 212 occurs at the current node's local successor hash table for the entry corresponding to the key string <keyStr> character immediately after the first pos characters (as noted above, pos denotes the character comparison position for the current node). If a corresponding entry is found in the course of lookup 212, then assignment 216 of the node referenced at that entry as the current node occurs (i.e., the referenced node becomes the current node). On the other hand, if no corresponding entry is found in the course of lookup 212, then assignment 214 of the first successor node (taken from the succFirst field) as the current node occurs. In either case, the current node is then given to decision 210.

Decision 218 is performed to determine whether a key string identical to key string <keyStr> already exists at the current node. If such a key string already exists, no insertion occurs, and termination 220 of the INSERT operation occurs with an error condition. However, if an identical key string does not already exist, comparison 222 is performed to determine the length <j> of the substring shared by key string <keyStr> and the key string associated with the current node. Then, starting with the current node, traversal 224 of the tree occurs upwardly by following the links pointing to each node's parent node until a node <t> is reached whose character comparison position pos is less than or equal to substring length <j>. Once this node is reached, determination 230 of whether to perform an outer tree insert or an inner tree insert is performed, as shown in FIG. 2a.

If decision 232 and decision 234 determine that node <t> is empty or the comparison position pos of <t> is equal to <j>, then outer tree insert 240 is performed. Otherwise, if node <t> is not empty and the comparison position pos of <t> is not equal to <j>, then inner tree insert 260 is performed.

Outer tree insert 240 involves the following steps. Registration 242 of node <t> as the new node's parent node occurs. Next, insertion 244 of a pointer to the new node (which is the new leaf node block allocated in allocation 202) occurs in <t>'s local successor hash table under the appropriate key string character, and any affected fields are updated (e.g. hashNext field, or, if the embodiment uses one, hashPrev field). Insertion 246 of the new node into the doubly linked sibling list of <t>'s successor nodes is also performed by updating the appropriate sblNext and sblPrev fields. Decision 248 is performed to determine whether the comparison position character of node <t> is a wildcard character. If so, <t>'s wildcard flag (if one exists in the embodiment) is set.

Inner tree insert 260 involves the following steps. Allocation 262 of a second new node block from the index's LIFO memory manager to become the new parent node occurs. Next, insertion 264 of a pointer to the new leaf node block (which was allocated in allocation 202) occurs in the second new node block's local successor hash table. Decision 266 is performed to determine whether node <t> is a NULL reference. If node <t> is a NULL reference, then registration 268 of the second new node block as the new root of the index tree occurs. Regardless of the outcome of decision 266, insertion 270 of the second new node block into its parent's local successor hash table occurs. Inner tree insert 260 ends with insertion 272 of the second new node block into the doubly linked sibling list of its parent's successor nodes. Insertion 272 also updates the appropriate sblNext and sblPrev fields.

Regardless of whether outer tree insert 240 or inner tree insert 260 occurs, the next step is increment 280 of the successor counter of the parent node. Subsequently, setting 282 of the wildcard flag of the parent node is executed if a wildcard is among its successor nodes. Finally, return 284 of a reference to the new leaf node block allocated in allocation 202 occurs as output parameter <keyHandle>.

As shown by the steps above for flowchart 200 described above, use of a fast LIFO memory manager creates an improvement over conventional memory management. The running time of conventional memory management generally depends on the total number of memory blocks allocated, at least in the worst case. In a situation where there is a large number of entries, the conventional method is often prohibitively slow. The LIFO memory manager, as shown, takes advantage of the fixed size of the tree nodes, which allows the tree nodes to be placed on a stack of free entries. Since pushing a free node onto the stack or removing an allocated node from the stack involves a single stack operation, the running time of LIFO memory management is independent from the number of nodes allocated.

Example of an INSERT Operation

The following is an outline of an example of an INSERT operation. Referring to FIG. 3 and FIG. 4, an example of an INSERT ("cedg") operation being performed on index tree 302, which starts out the same as index tree 2, is shown. First, FI traverses index tree 302 in order to find the place of insertion for the new key string. FI starts at root node 4, whose pos field 331 indicates that the first zero (i.e., none of the first) characters are identical for all key strings contained within the subtree springing from root node 4. Thus, since the first character of the string to be inserted is "c", FI looks up hash bucket 341 in hash table array 340. FI follows "c"-branch reference 350 to interior node 8. As an aside, it should be noted that it the insertion string had "g" as the first character, there would have been a hash collision (since both "c" and "g" occupy hash bucket 341), and the reference link to leaf node 5d contained in hashNext field 19 would have been followed.

At interior node 8, pos field 11 indicates that the character comparison position pos is two. Thus the third character of the string to be inserted, namely "d", is considered, and FI looks up hash bucket 18d in hash table array 18. FI follows "d"-branch 360 to leaf node 5c.

Next, FI traverses tree index 302 back up again until it finds a node whose character comparison position pos is less than or equal to the length of the substring that "cedg" has in common with the key string associated with leaf node 5c (namely, "cddh"). It follows that FI is looking for a pos field where pos is less than or equal to one. The first pos field fitting this criteria that FI finds on its upward traversal through parent node links 370 and 380 is pos field 331, which happens to be a field of root node 4. Since the node is not empty (see decision 232 above) and since pos field 331 contains a pos not equal to one (see decision 234 above), an inner tree insert 260 needs to be performed.

FIG. 4 illustrates the transformation of index tree 302 to index tree 402 upon execution of inner tree insert 260. First, two new nodes, new interior node 408 and new leaf node 405, are allocated from FI's LIFO memory manager (LIFO-MM) 440. New interior node 408 is inserted as a successor of "c"-branch reference 350 of root node 4. The old "c"-branch successor, which is interior node 8, now becomes the successor of "d"-branch reference 450 of new interior node 408. Furthermore, new leaf node 405 becomes the successor of "e"-branch reference 460 of new interior node 408.

REMOVE Operation

The REMOVE operation removes a specific index entry previously inserted by the INSERT operation by removing the associated node. The index entry to be removed is specified by its corresponding key handle as returned by the INSERT operation or FIND operation.

The following input parameters are used in a preferred embodiment of the REMOVE operation. The <idxHd> input parameter is the handle of the index object from which the index entry is to be removed. The <keyHandle> input parameter is the handle for the index entry (or node) to be removed.

Referring to FIG. 5, the steps performed by a preferred embodiment of the REMOVE operation is outlined in flowchart 500. The first step is decision 504 to determine whether the node to be removed has a parent node. If the node does not have a parent node, then setting 506 of the root of the index tree to a NULL reference occurs, after which freeing 550 of memory blocks belonging to removed tree node occurs. On the other hand, if the node does have a parent node, then a removal 508 of reference by the parent node to the node occurs (the succFirst field of the parent node may also have to be modified). Furthermore, removal 510 of the node from the doubly linked sibling list of the parent node's successor nodes occurs by updating the appropriate sblNext and sblPrev fields. Next, decrement 512 of the successor counter of the parent node occurs. At this point, there are no more references in the index tree to the removed node. However, the REMOVE operation may still need to modify the index tree.

Decision 520 determines whether the parent node has more than one successor node left. If the parent node does have more than one successor node left, then decision 540, which determines whether the removed node's comparison character was a wildcard character, is executed. On the other hand, if the parent node has only one successor node left, then the parent node is obsolete as a branching point, and decision 522 determines whether a grandparent (i.e., grandparent of the removed node, also the parent of the parent node) exists. If a grandparent node does not exist, then assignment 524 of new root of the index tree is given to the sole sibling of the removed node, after which decision 540, which determines whether the removed node's comparison character was a wildcard character, is executed. On the other hand, if a grandparent node does exist, then unlinking 526 of the parent node from the grandparent node's hash table occurs. Next, insertion 528 of reference to the removed node's sole sibling occurs in the grandparent node's hash table. Removal 530 of the parent node occurs. The grandparent node is now the new parent node.

Decision 540 determines whether the removed node's comparison character was a wildcard character. If the removed node's comparison character was a wildcard character, then deletion 542 of the wildcard flag occurs in the parent node. Whether or not the removed node's comparison character was a wildcard character, the REMOVE operation ends with freeing 550 of memory blocks belonging to removed tree node(s).

As shown by the steps above in flowchart 500, the removal of links to a node (such as removal 510 of a node from a doubly linked sibling list) leads to freeing 550 of memory blocks. If a conventional single-linked list were used, removing a node would require linearly searching a sibling list until the node to be removed is found. This would have created a linear component to the execution time of a REMOVE operation. In the worst case, the entire sibling list would have to be searched. However, the doubly linked sibling list together with LIFO memory management supports deleting nodes without any linearly list-scanning, thereby improving overall performance.

Example of a REMOVE Operation

The following is an outline of an example of a REMOVE operation. Referring to FIG. 6 and FIG. 7, an example of a REMOVE("cdaf") operation being performed on index tree 602, which starts out the same as index tree 2, is shown. First, it is assumed that the user supplies the necessary key handle <keyHandle> identifying the leaf node (leaf node 5b in the example) to be removed. Leaf node 5b is first removed from its parent node, interior node 8. Since interior node 8 now has only one successor node (namely, leaf node 5c), interior node 8 is obsolete as a branching point and needs to be removed. Therefore, interior node 8 and "c"-branch reference 350 of root node 4 are removed. The free nodes, leaf node 5b and interior node 8, are returned to LIFO-MM 440.

Referring to FIG. 7, index tree 702 shows new leaf node 710, transformed from old leaf node 5c. Root node's 4 "c"-branch reference 350 is replaced by "c"-branch reference 750 to leaf node 710. Leaf node 710 inherits doubly linked sibling list links 760 with leaf node 5a and leaf node 5d. HashNext field 720 of leaf node 710 inherits the contents of hashNext field 19.

FIND Operation (Exact Match)

The Exact Match version of the FIND Operation searches a specified index for an entry exactly matching the search key string. Unlike partial match queries, the wildcard character has no special meaning in an exact search. At most, one index entry matches the search string. Upon successful completion of this operation, the keyhandle of the matching index entry is returned. The following input and output parameters are used in a preferred embodiment of the Exact Match version of the FIND operation.

The <idxHd> input parameter is the handle of the index object to be searched. The <keyStr> input parameter is the pointer to the key string that is being searched for in the index. The <keyHandle> output parameter is the handle for the matching index entry.

Referring to FIG. 8, the steps performed by a preferred embodiment of the Exact Match FIND operation is outlined in flowchart 800. The first step is reference 802 to the root node of the index tree being searched. Next, decision 804 determines whether the current node is an interior node. If the current node is not an interior node, then complete string comparison 820 is performed between the search key string and the key string associated with the current node. On the other hand, if the current node is an interior node, then consideration 806 is taken of the search key string character at the node's character comparison position. Retrieval 808 of the pointer to the next node is accomplished by using the current node's successor hash table. Next, assignment 810 of the next node to be the new current node occurs. Decision 804 is performed on the new current node.

Complete string comparison 820 is performed between the search key string and the key string associated with the current node. If the strings are not identical, termination 822 of the search occurs and an error condition is raised. On the other hand, if the strings are identical return 824 of the reference to the current leaf node as a handle to the index entry occurs.

FIND Operation (Partial Match)

The Partial Match version of the FIND Operation may be used to iteratively scan for a set of all index entries matching a specified search string having wildcard characters (in a preferred embodiment of the invention, the wildcard character is "*" by default). For example, given the operations INSERT("abadc"), INSERT("abbcd"), INSERT("ba*dc"), INSERT("ba*dd"), INSERT("badac"), INSERT("badbc"), and INSERT("d*a**"), the partial match query FIND ("*b*cd") will yield "abbcd" and "d*a**", since the first and third characters of the string entries are irrelevant for the purposes of this particular search. The following input and output parameters are used in a preferred embodiment of the Partial Match version of the FIND operation.

The input parameters include <idxHd>, <keyStr>, <maxResults> and <resultBuffer>. The <idxHd> parameter is the handle of the index object to be searched. The <keyStr> parameter is a pointer to the key string that is being searched for in the index. The <maxResults> parameter is the maximum number of key handles to be returned per iteration of the FIND operation. The <resultBuffer> parameter is a pointer to a result buffer, which is an array of key handles that is large enough to hold up to <maxResults> entries.

The output parameters include <actResults> and <moreResults>. The <actResults> parameter returns the actual number of keys returned in the result buffer. The <moreResults> parameter, also called the search control parameter, serves as a flag to indicate whether there were more than <maxNumber> results.

The steps performed by a preferred embodiment of the Partial Match FIND operation is outlined in flowchart 900, which is shown in FIGS. 9 and 9a. The first step is decision 904 to determine whether this is the first call of the FIND operation. If this is the first call of the FIND operation, reset 906 of the local backtracking stack pointer <sp> to the root node of the index tree occurs. On the other hand, if this is not the first call of the FIND operation, then reload 908 of the stack pointer previously saved from the previous call of the FIND operation occurs. Whether or not this is the first call of the FIND operation, the next step is decision 910 to determine whether the backtracking stack is empty occurs. If the backtracking stack is empty, the FIND operation ends with return 994 of the result buffer. On the other hand, if the backtracking stack is not empty, then retrieval 911 of tree node <t> from the current stack top occurs. Then decision 912 to determine whether <t> is a leaf node occurs. If <t> is a leaf node, then leaf node analysis 920 occurs. On the other hand, if <t> is not a leaf node, then interior node analysis 950 occurs.

Leaf node analysis 920 starts with comparison 922 to determine whether the search key string and the key string associated with the leaf node are the same, and comparison 928 to determine whether the search key string and the key string associated with the leaf node match when wild cards are taken into consideration. If the two strings are the same or match with wild cards, then addition 930 of the index entry associated with the leaf node occurs to the result buffer (i.e., the index entry is added to the result buffer). Regardless of whether or not the strings are the same or otherwise match, assignment 931 of the current character position to be the first character position which is not a wild card and where the search key string and the key string associated with the leaf node are different, occurs. Leaf node analysis 920 ends with pruning 932 of the backtrack stack. Pruning 932 of the backtrack stack occurs by iteratively checking 933 whether (a) the stack is not empty and (b) the character comparison position <pos> of the parent node is greater than character comparison position <j>, and removal 934 of a node from the backtrack stack until at least one of these two conditions is no longer met. After leaf node analysis 920 ends, decision 910 is performed again.

Interior node analysis 950 starts with assignment 952 of <ch> to be the search key string character at the current node's character comparison position. Wildcard check 954 determines whether <ch> is a wildcard character. If <ch> is a wildcard character, then interior node analysis 950 ends with push 970 of all successor nodes onto the backtrack stack. Push 970 accomplishes this task by following the sibling-links within <t>'s successor list, which means the whole subtree descending from <t> is marked for further search. On the other hand, if <ch> is not a wildcard character, then lookup 955 of the hash table occurs. Lookup 955 finds the successor node associated with <ch> (or, alternatively, if there is no successor node associated with <ch>, the first successor node) and pushes the node onto the backtrack stack. Next, decision 956 determines whether <t> has a wild card among its successor node. If <t> does not have a wild card successor node, then interior node analysis 950 ends. On the other hand, if <t> does have a have a wild card successor node, then interior node analysis 950 ends with push 958 of the wild card successor node onto the backtrack stack. After interior node analysis 950 ends, decision 910 is performed again.

Example of a FIND Operation (Partial Match)

The following is an outline of an example of a Partial Match FIND operation. Referring to FIG. 10, an example of a FIND("*b*cd") operation being performed on index tree 1002 is shown. Index tree 1002 comprises nodes 1010, 1020, 1030, 1040, 1050, 1060, 1070, 1080, 1090, 1100, 1110, and 1120. Node 1010 is the root node of index tree 1002; therefore it has a character comparison position pos zero. Interior node 1020 has pos two and comparison character "a"; interior node 1030 has pos two and comparison character "b"; interior node 1070 has pos four and comparison character "*" (the wildcard character); interior node 1080 has pos three and comparison character "d". Leaf node 1040 is a successor node of node 1010, and is associated with key string "d*a*". Leaf nodes 1050 and 1060 are successor nodes of node 1020 and are associated with key strings "abadc" and "abbcd", respectively. Leaf nodes 1090 and 1100 are successor nodes of node 1070 and are associated with key strings "ba*dc" and "ba*dd", respectively. Leaf nodes 1110 and 1120 are successor nodes of node 1080 and are associated with key strings "badac" and "badbc", respectively.

FI starts the search at root node 1010 of index tree 1002. Since pos is zero for node 1010, FI looks at the first character of search key string "*b*cd". This is a wildcard character, so FI pushes each successor node of node 1010 (i.e., nodes 1020, 1030, and 1040) onto the backtracking stack. Note that the backtracking stack now has, from top (first) to bottom (last), nodes 1020, 1030, and 1040. Next, the first node in the backtracking stack, node 1020, is popped from the top. Since node 1020 has pos two, the third character of the search key string is evaluated. This is again a wildcard character, so FI pushes each successor node of node 1020 (i.e., nodes 1050 and 1060) onto the backtracking stack. The backtracking stack now has, from top to bottom, nodes 1050, 1060, 1030, and 1040.

Next, node 1050 is popped from the top of the backtracking stack. Since this is a leaf node, FI determines the first non-wildcard character position <j> where the search key string differs from the key string associated with node 1050. The key strings "*b*cd" and "abadc" differ at the fourth character (since they match for the first three characters, <j> is three), and node 1050 is discarded as a mismatch. Node 1060 is popped from the top of the backtracking stack. This is also a leaf node, and FI seeks the first non-wildcard character position <j> where the search key differs from the key string associated with node 1060. However, "*b*cd" and "abbcd" match, so the key entry associated with node 1060 becomes the first addition to the result buffer.

FI determines that there are still nodes in the backtracking stack, so the next node, node 1030, is popped from the top. Node 1030 happens to be an interior node having pos two, so the third character of the search key string is evaluated. This is again a wildcard character, so FI pushes each successor node of node 1030 (i.e., nodes 1070 and 1080) onto the backtracking stack. The backtracking stack now has, from top to bottom, nodes 1070, 1080, 1030, and 1040.

There are still nodes in the backtracking stack, so node 1070 is popped off the top. Node 1070 is an interior node having pos four, so the fifth character of the search key string is evaluated. The character at this position is "d", so "d"-branch 1072 of node 1070 is followed to node 1100 (discarding node 1090 in the process).

Node 1100 is a leaf node, so FI determines the first non-wildcard character position <j> where the search key string differs from the key string associated with node 1050. The key strings "*b*cd" and "ba*dd" differ at the second character (since they match for the first character, <j> is one), and node 1100 is discarded as a mismatch. It is at this point that heuristic pruning is employed to discard an additional entire subtree. It is a property of the FI tree that if the key string differs from the leaf node 1100 when <j> equals one, then it must also differ from any other node whose parent's pos is greater than one. This property derives from the fact that all key strings associated with a subtree share a prefix having a length equal to pos of the interior node at the root of the subtree. Therefore, since node 1030 has pos two, all the nodes in the subtree that are still in the backtracking stack (namely, nodes 1070 and 1080) may be discarded, thereby pruning the index tree.

The only remaining node still in the backtracking stack, node 1040, is popped. This is a leaf node, and FI seeks the first non-wildcard character position <j> where the search key differs from the key string associated with node 1040. However, "*b*cd" and "d*c" match, so the key entry associated with node 1040** is added to the result buffer. There are no more nodes to be considered, and the result stack is returned.

Figure 11:
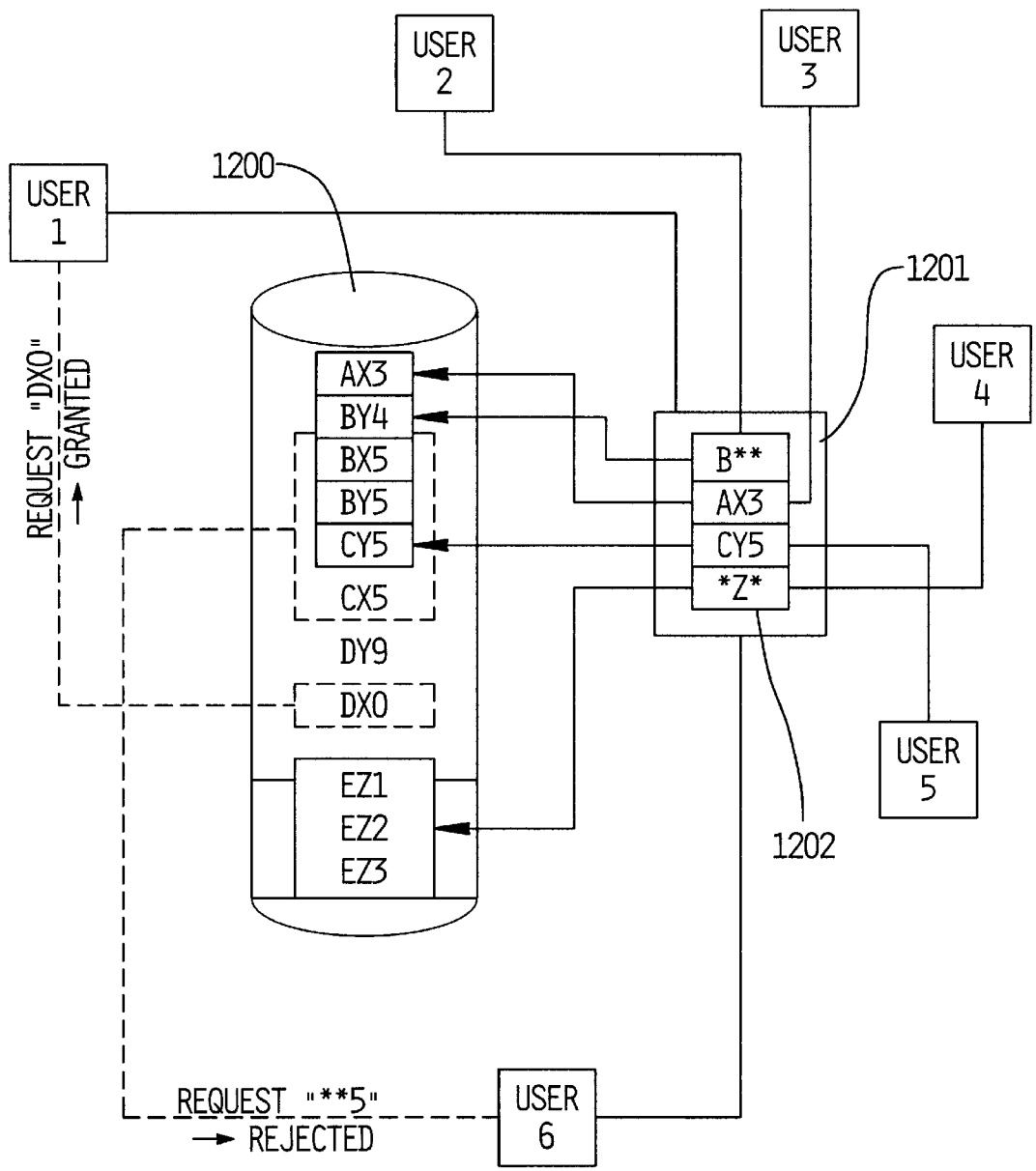
FIG. 11 is a representation of a logical lock management by use of a FI indexed lock table.

In FIG. 11 an advantageous use of the FI method according to the invention is represented for performing logical lock management. FI can be used for collision detection or management in database applications such as human resources management, financials, logistics, business work flow, organizational management and other systems. In such applications a number of users, for example users 1 to 6 in FIG. 11, accesses the data stored in database 1200. Logical lock management is used to prevent several users from accessing the same data set in database 1200 simultaneously with a request or operation that would amend the data set (for example by writing or deleting). It has to be ensured that amendments of data sets are performed in a defined order by one user after the other.

In order to ensure this, a lock manager 1201 is established in order to detect collisions between requests of the users to the database 1200. In FIG. 11 for example, there is a collision between the requests of user 1 and user 6, as indicated by the lines stopping at the border of lock manager 1201. Obviously, the performance of a multiuser environment of a database is very critical with respect to the performance of the lock manager 1201, because the lock manager 1201 may become a bottleneck for the throughput of the whole system in view of the fact that each user's request has to pass the lock collision test before accessing database 1200.

According to the invention a method for collision detection or collision management of requests of several users accessing a database 1200 including a plurality of string entries, in particular a method for performing a lock management, is disclosed. A preferred embodiment of this method comprises maintenance of a dynamic lock table 1202 and is utilized in conjunction with requests of users in which the requests are indexed according to the invention, such as by the FI method. A query associated with the request of a user is sent to the lock table 1202 before the request of the user is passed to the database 1200. In a preferred embodiment lock manager 1201 maintains a FI-indexed lock table 1202, where the locks reside and reject requests for data sets already being accessed. For example, in FIG. 11 request "5" of user 6 is rejected, because of he request "CY5" of user 5** accessing the same data set.

By way of example, as shown in FIG. 11 if there is writing request of user 1 to the data set having index "DX0", at first an insert-operation to the FI-indexed lock table 1202 is performed by which index "DX0" is inserted into the FI search tree. If index "DX0" could be inserted into the FI search tree, the insert operation is performed successfully and user 1 can perform a write access to the data set in the database 1200 that corresponds to the "DX0" index. However, if index-string "DX0" was already included as a leaf-node in the FI search tree, which is detected by the lock manager 1201, then a collision is indicated, the insert operation would not be successful, and the writing access of user 1 to the associated data set in database 1200 is denied. In a preferred embodiment, user 1 could be advised that a lock has occurred.

When a successful writing access to database 1200 is completed, the remove operation is performed in the FI lock table 1202, causing the deletion of the leaf-node with indexed string "DX0" from FI lock table 1202. After that, other users can access data sets corresponding to index string "DX0" in database 1200. In a preferred embodiment, user 1, who had previously attempted to perform a write access, could be alerted when the lock is removed and/or the write access could be automatically initiated.

Locks can be granted for single (i.e., fully specified) database table entries (e.g., "AX3", which contains no wildcards) as well as for whole sets (i.e., partially specified) entries (e.g., "B**", where the "*" represents a wildcard that is any letter of the underlying alphabet).

In view of the fact that, in a preferred embodiment utilizing lock management, all requests and accesses to the database 1200 are matched into a single FI search tree, the response and performance of the lock manager 1201 is important for the overall performance of accesses to database 1200. If the lock manager 1201 maintains a FI-indexed lock table 1202, a good performance of the lock manager 1201 results in good result times. In this respect, in particular the following features which are described herein may be advantageous: the search tree is constructed as a prefix tree, local hash tables are used, partially matched requests may be performed, the performance of last-in-first-out memory management, and the performance of pruning and/or performing of back tracking during the search.

An advantage of the invention is that in a preferred embodiment, partially specified strings (for example "ab*c" or "*bc*") can also be stored in the lock table 1202. Therefore, it is possible to match parts of data sets which are accessed by a single index insert (containing wildcards) into the FI lock table 1202. Thus, it is not necessary to mark all the individual data sets matching the partially specified string, as it is required in known search algorithms such as linear search and hashing. The possibility to perform a partially specified index request reduces the required search time in the FI lock table 1202, and is a further advantageous feature in addition to the above-mentioned features of the FI search tree and the search methods based thereon.

Comparison With Other Search Methods

The following is an overview of how one actual implementation of the invention, referred to as "FI", compares to the other search methods described above. Table 1 illustrates the time, in microseconds, for one complete INSERT/FIND/REMOVE cycle to be performed on an Intel Pentium P180 machine. For the purpose of this comparison, the FI program and commonly used UNIX standard string indexing and searching libraries performed cycles on a real-world database (where the entries are not evenly distributed in a search tree). The BTREE search was performed using the UNIX/XPG4 tsearch(3C) binary search tree standard library, the HASH search was performed using the UNIX/XPG4 hsearch(3C) standard hash table library, while the LINEAR search was performed with a straightforward doubly linked list bused linear search.

TABLE 1

| # entries | FI | BTREE | HASH | LINEAR |
|---|---|---|---|---|
| 1,000,000 | 32 | ??? | ??? | 300,000 |
| 100,000 | 21 | 1898 | 702 | 30,000 |
| 10,000 | 18 | 206 | 56 | 3,000 |
| 1,000 | 11 | 37 | 19 | 300 |
| 100 | 8 | 28 | 10 | 30 |
| 10 | 6 | 13 | 5 | 3 |
| 1 | 2 | 5 | 3 | 0.5 |

Note that the running time for the fast string method remains in the magnitude of some tens of microseconds, even when searching through one million entries.

It has also been shown that the fast string method provides superior performance and robustness against the size of the key strings to be searched. Table 2 illustrates the time, in microseconds, for FI and HASH to perform searches on databases containing key strings of various lengths. The running time for the fast string method changes only slightly, even when the key strings are orders of magnitude larger.

TABLE 2

| | byte length | | | | | | |
|---|---|---|---|---|---|---|---|
| | 16 | 32 | 64 | 128 | 256 | 512 | 1024 |
| FI | 5 | 5 | 5 | 6 | 7 | 7 | 7 |
| HASH | 5 | 6 | 9 | 14 | 20 | 34 | 68 |

A summary of the features of the invention and other search methods is shown in Table 3. A plus "+" in a cell indicates that the search method is particularly well suited (or is robust) for the feature indicated.

TABLE 3

| | FI | LINEAR | HASH | BTREE |
|---|---|---|---|---|
| Number of strings | + | -- | + | + |
| String Length | + | -- | -- | -- |
| String distribution | + | -- | -- | -- |
| Partial match query | + | + | -- | -- |
| Partial match indexing | + | -- | -- | -- |
| Implementational Overhead | + | + | + | -- |
| Multi-process support | + | -- | -- | -- |

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A search tree for indexing a plurality of string entries, wherein each one of said plurality of string entries is a string of characters, comprising:
   a plurality of linked nodes consisting of a root node, a plurality of inner nodes wherein each one of said plurality of inner nodes is associated with a character or substring of characters, and a plurality of leaf nodes, wherein said each one of said plurality of inner nodes further comprises:
   (a) a reference to a parent node, wherein said parent node is either said root node or another of said plurality of inner nodes;
   (b) a first data field containing a character comparison position indicating the number of characters in said character or substring of characters associated with said one of said plurality of inner nodes;
   (c) a second data field containing a comparison character, said comparison character used to determine whether said character or substring of characters associated with said one of said plurality of inner nodes is contained in a string entry at a character position of said string entry associated with said character comparison position;
   (d) a reference to at least two successor nodes; and
   (e) a hash table array containing a predetermined number of hash buckets.

2. The search tree for indexing a plurality of strings of claim 1, wherein the number of characters in each one of said plurality of string entries is the same.

3. The search tree for indexing a plurality of strings of claim 1, wherein at least one of said plurality of inner nodes has a reference to a parent node having a character comparison position that is at least two less than the character comparison position of said at least one of said plurality of inner nodes.

4. The search tree for indexing a plurality of strings of claim 1, wherein each one of said plurality of inner nodes is associated with a level and further comprises a reference link to at least one of said plurality of linked nodes also associated with said level.

5. The search tree for indexing a plurality of strings of claim 1, wherein said string of characters is a string of alphanumeric characters and at least one of said plurality of string entries contains a wildcard character.

6. The search tree for indexing a plurality of strings of claim 1, wherein a search of said search tree utilizes a LIFO memory manager for managing a stack having links to at least some of said plurality of linked nodes.

7. The search tree for indexing a plurality of strings of claim 6, wherein said search utilizes backtracking.

8. The search tree for indexing a plurality of strings of claim 6, wherein said search utilizes pruning of said stack.

9. The search tree for indexing a plurality of strings of claim 4, wherein at least some of said reference links form a doubly-linked list.

10. A method for searching for a certain string, consisting of a plurality of characters, among a plurality of strings, wherein each one of said plurality of strings is a string of characters, comprising the steps of:

creating on an R/3 system a search tree having a plurality of linked nodes consisting of a root node, a plurality of inner nodes wherein each one of said plurality of inner nodes is associated with a character or substring of characters, and a plurality of leaf nodes associated with said plurality of strings, wherein said each one of said plurality of inner nodes comprises:
  (a) a reference to a parent node, wherein said parent node is either said root node or another of said plurality of inner nodes;
  (b) a first data field containing a character comparison position indicating the number of characters in said character or substring of characters associated with said one of said plurality of inner nodes;
  (c) a second data field containing a comparison character, said comparison character used to determine whether said character or substring of characters associated with said one of said plurality of inner nodes is contained in a string entry at a character position of said string entry associated with said character comparison position;
  (d) a reference to at least two successor nodes; and
  (e) a hash table array containing a predetermined number of hash buckets;

forming on an R/3 system a query associated with said certain string; and traversing said search tree utilizing said query and providing an index to any of said plurality of strings that matches said certain string.

11. A method for indexing a plurality of string entries, wherein each one of said plurality of string entries is a string of characters, comprising the steps of:

creating a search tree comprising a plurality of linked nodes comprising a root node, a plurality of inner nodes wherein each one of said plurality of inner nodes is associated with a character or substring of characters, and a plurality of leaf nodes associated with said plurality of string entries, wherein said each one of said plurality of inner nodes further comprises:
  (a) a reference to a parent node, wherein said parent node is either said root node or another of said plurality of inner nodes;
  (b) a first data field containing a character comparison position indicating the number of characters in said character or substring of characters associated with said one of said plurality of inner nodes;
  (c) a second data field containing a comparison character, said comparison character used to determine whether said character or substring of characters associated with said one of said plurality of inner nodes is contained in a string entry at a character position of said string entry associated with said character comparison position;
  (d) a reference to at least two successor nodes; and
  (e) a hash table array containing a predetermined number of hash buckets;

and applying said search tree to said indexing of said plurality of string entries.

12. The method for indexing a plurality of strings of claim 11, wherein the number of characters in each one of said plurality of string entries is the same.

13. The method for indexing a plurality of strings of claim 11, wherein at least one of said plurality of inner nodes has a reference to a parent node having a character comparison position that is at least two less than the character comparison position of said at least one of said plurality of inner nodes.

14. The method for indexing a plurality of strings of claim 11, wherein each one of said plurality of inner nodes is associated with a level and further comprises a reference link to at least one of said plurality of linked nodes also associated with said level.

15. The method for indexing a plurality of strings of claim 11, wherein at least some of said reference links form a doubly-linked list.

16. The method for indexing a plurality of strings of claim 11, wherein said string of characters is a string of alphanumeric characters and at least one of said plurality of string entries contains a wildcard character.

17. The method for indexing a plurality of strings of claim 11, wherein a search of said search tree utilizes a last-in first-out memory manager for managing a stack having links to at least some of said plurality of linked nodes.

18. The method for indexing a plurality of strings of claim 17, wherein said search utilizes backtracking.

19. The method for indexing a plurality of strings of claim 17, wherein said search utilizes pruning of said stack.

20. A method for searching for a certain string, consisting of a plurality of characters, among a plurality of strings, wherein each one of said plurality of strings is a string of characters, comprising the steps of:

creating a search tree comprising a plurality of linked nodes comprising a root node, a plurality of inner nodes wherein each one of said plurality of inner nodes is associated with a character or substring of characters, and a plurality of leaf nodes associated with said plurality of string entries, wherein said each one of said plurality of inner nodes further comprises:
  (a) a reference to a parent node, wherein said parent node is either said root node or another of said plurality of inner nodes;
  (b) a first data field containing a character comparison position indicating the number of characters in said character or substring of characters associated with said one of said plurality of inner nodes;
  (c) a second data field containing a comparison character, said comparison character used to determine whether said character or substring of characters associated with said one of said plurality of inner nodes is contained in a string entry at a character position of said string entry associated with said character comparison position;

(d) a reference to at least two successor nodes; and (e) a hash table array containing a predetermined number of hash buckets;

wherein said plurality of strings forms a plurality of string entries;

forming a query associated with said certain string; and traversing said search tree utilizing said query and providing an index to any of said plurality of strings that matches said certain string.

21. The method for searching for a certain string of claim 20, wherein said certain string consists of a plurality of alphanumeric characters and at least one wildcard.

22. The method for searching for a certain string of claim 20, wherein said traversal utilizes a last-in first-out memory manager for managing a stack having links to at least some of said plurality of linked nodes.

23. The method for searching for a certain string of claim 22, wherein said traversal utilizes backtracking.

24. The method for searching for a certain string of claim 22, wherein said traversal utilizes pruning of said stack.

25. The method for searching for a certain string of claim 20, wherein the steps of creating a search tree and forming a query associated with said certain string are performed on a human resources management, financials, logistics, business workflow, personnel management, organizational management, payroll accounting, time management, personnel development or network system.

26. A method for collision detection or collision management of requests of several users accessing a database including a first plurality of string entries, comprising maintenance of a dynamic lock table including the requests of the users, comprising the steps of: indexing said requests as a second plurality of string entries, wherein each one of said second plurality of string entries is a string of characters, by using a search tree, said search tree comprising:

a plurality of linked nodes comprising a root node, a plurality of inner nodes wherein each one of said plurality of inner nodes is associated with a character or substring of characters, and a plurality of leaf nodes associated with said second plurality of string entries, wherein said each one of said plurality of inner nodes further comprises:

(a) a reference to a parent node, wherein said parent node is either said root node or another of said plurality of inner nodes;

(b) a first data field containing a character comparison position indicating the number of characters in said character or substring of characters associated with said one of said plurality of inner nodes;

(c) a second data field containing a comparison character, said comparison character used to determine whether said character or substring of characters associated with said one of said plurality of inner nodes is contained in a string entry at a character position of said string entry associated with said character comparison position;

(d) a reference to at least two successor nodes; and (e) a hash table array containing a predetermined number of hash buckets; and performing a query to the lock table associated with a request of a user to the database before passing the request of the user to the database.

27. A computer-readable medium having stored thereon a plurality of instructions, said plurality of instructions including instructions which, when executed by a processor, cause said processor to index a plurality of string entries wherein each one of said plurality of string entries is a string of characters, by using a search tree, said search tree comprising:

a plurality of linked nodes comprising a root node, a plurality of inner nodes wherein each one of said plurality of inner nodes is associated with a character or substring of characters, and a plurality of leaf nodes associated with said plurality of string entries, wherein said each one of said plurality of inner nodes further comprises:

(a) a reference to a parent node, wherein said parent node is either said root node or another of said plurality of inner nodes;

(b) a first data field containing a character comparison position indicating the number of characters in said character or substring of characters associated with said one of said plurality of inner nodes;

(c) a second data field containing a comparison character, said comparison character used to determine whether said character or substring of characters associated with said one of said plurality of inner nodes is contained in a string entry at a character position of said string entry associated with said character comparison position;

(d) a reference to at least two successor nodes; and (e) a hash table array containing a predetermined number of hash buckets.

28. The computer-readable medium of claim 27, wherein the number of characters in each one of said plurality of string entries is the same.

29. The computer-readable medium of claim 27, wherein at least one of said plurality of inner nodes has a reference to a parent node having a character comparison position that is at least two less than the character comparison position of said at least one of said plurality of inner nodes.

30. The computer-readable medium of claim 27, wherein each one of said plurality of inner nodes is associated with a level and further comprises a reference link to at least one of said plurality of linked nodes also associated with said level.

31. The computer-readable medium of claim 27, wherein at least some of said reference links form a doubly-linked list.

32. The computer-readable medium of claim 27, wherein said string of characters is a string of alphanumeric characters and at least one of said plurality of string entries contains a wildcard character.

33. The computer-readable medium of claim 27, wherein a search of said search tree utilizes a last-in first-out memory manager for managing a stack having links to at least some of said plurality of linked nodes.

34. The computer-readable medium of claim 33, wherein said search utilizes backtracking.

35. The computer-readable medium of claim 33, wherein said search utilizes pruning of said stack.

36. A computer-readable medium having stored thereon a plurality of instructions, said plurality of instructions including instructions which, when executed by a processor, causes said processor to search for a certain string, consisting of a plurality of characters, among a plurality of strings, wherein each one of said plurality of strings is a string of characters, comprising the steps of:

creating a search tree comprising a plurality of linked nodes comprising a root node, a plurality of inner nodes wherein each one of said plurality of inner nodes is associated with a character or substring of characters, and a plurality of leaf nodes associated with said plurality of string entries, wherein said each one of said plurality of inner nodes further comprises:

(a) a reference to a parent node, wherein said parent node is either said root node or another of said plurality of inner nodes;

(b) a first data field containing a character comparison position indicating the number of characters in said character or substring of characters associated with said one of said plurality of inner nodes;

(c) a second data field containing a comparison character, said comparison character used to determine whether said character or substring of characters associated with said one of said plurality of inner nodes is contained in a string entry at a character position of said string entry associated with said character comparison position;

(d) a reference to at least two successor nodes; and (e) a hash table array containing a predetermined number of hash buckets;

wherein said plurality of strings forms a plurality of string entries;

forming a query associated with said certain string; and traversing said search tree utilizing said query and providing an index to any of said plurality of strings that matches said certain string.

37. The computer-readable medium of claim 36, wherein said certain string consists of a plurality of alphanumeric characters and at least one wildcard.

38. The computer-readable medium of claim 36, wherein said traversal utilizes a last-in first-out memory manager for managing a stack having links to at least some of said plurality of linked nodes.

39. The computer-readable medium of claim 36, wherein said traversal utilizes backtracking.

40. The computer-readable medium of claim 36, wherein said traversal utilizes pruning of said stack.

41. The computer-readable medium of claim 36, wherein the steps of creating a search tree and forming a query associated with said certain string are performed on a human resources management, financials, logistics, business workflow, personnel management, organizational management, payroll accounting, time management, personnel development or network system.

42. A computer-readable medium having stored thereon a plurality of instructions, said plurality of instructions including instructions which, when executed by a processor, cause said processor to detect or manage a collision of requests of several users accessing a database including a first plurality of string entries, by:

maintaining a dynamic lock table including requests of the users;

indexing said requests as a second plurality of string entries, wherein each one of said second plurality of string entries is a string of characters, by using a search tree, said search tree comprising:

a plurality of linked nodes comprising a root node, a plurality of inner nodes wherein each one of said plurality of inner nodes is associated with a character or substring of characters, and a plurality of leaf nodes associated with said second plurality of string entries, wherein said each one of said plurality of inner nodes further comprises:

(a) a reference to a parent node, wherein said parent node is either said root node or another of said plurality of inner nodes;

(b) a first data field containing a character comparison position indicating the number of characters in said character or substring of characters associated with said one of said plurality of inner nodes;

(c) a second data field containing a comparison character, said comparison character used to determine whether said character or substring of characters associated with said one of said plurality of inner nodes is contained in a string entry at a character position of said string entry associated with said character comparison position;

(d) a reference to at least two successor nodes; and (e) a hash table array containing a predetermined number of hash buckets; and performing a query to the lock table associated with a request of a user to the database before passing the request of the user to the database.

43. A system for searching a certain string, consisting of a plurality of characters, among a plurality of strings, wherein each one of said plurality of strings is a string of characters, comprising:

means for creating a search tree having a plurality of linked nodes comprising a root node, a plurality of inner nodes wherein each one of said plurality of inner nodes is associated with a character or substring of characters, and a plurality of leaf nodes associated with said plurality of strings, wherein said each one of said plurality of inner nodes comprises:

(a) a reference to a parent node, wherein said parent node is either said root node or another of said plurality of inner nodes;

(b) a first data field containing a character comparison position indicating the number of characters in said character or substring of characters associated with said one of said plurality of inner nodes;

(c) a second data field containing a comparison character, said comparison character used to determine whether said character or substring of characters associated with said one of said plurality of inner nodes is contained in a string entry at a character position of said string entry associated with said character comparison position;

(d) a reference to at least two successor nodes; and (e) a hash table array containing a predetermined number of hash buckets;

means for submitting a query associated with said certain string; and tree traversal means for providing an index to any of said plurality of strings that matches said certain string.

44. The system of claim 43, wherein the number of characters in each one of said plurality of strings is the same.

45. The system of claim 43, wherein at least one of said plurality of inner nodes has a reference to a parent node having a character comparison position that is at least two less than the character comparison position of said at least one of said plurality of inner nodes.

46. The system of claim 43, wherein each one of said plurality of inner nodes is associated with a level and further comprises a reference link to at least one of said plurality of linked nodes also associated with said level.

47. The system of claim 43, wherein said certain string consists of a plurality of alphanumeric characters and at least one wildcard.

48. The system of claim 43, comprising collision detection or collision management by use of a dynamic lock table.

* * * * *